(12) United States Patent
Adams et al.

(10) Patent No.: US 10,134,091 B2
(45) Date of Patent: Nov. 20, 2018

(54) SYSTEM AND METHOD FOR DETERMINING DRIVER SIGNATURES

(71) Applicant: Hartford Fire Insurance Company, Hartford, CT (US)

(72) Inventors: Isaac D. Adams, Canton, CT (US); Steven J. Fernandes, West Hartford, CT (US); Marc J. Natrillo, Avon, CT (US); Paul Brendan Olson, Hartford, CT (US); Pankaj Prakash, Rocky Hill, CT (US)

(73) Assignee: HARTFORD FIRE INSURANCE COMPANY, Hartford, CT (US)

( * ) Notice: Subject to any disclaimer, the term of this patent is extended or adjusted under 35 U.S.C. 154(b) by 242 days.

(21) Appl. No.: 14/145,142

(22) Filed: Dec. 31, 2013

(65) Prior Publication Data
US 2015/0187013 A1 Jul. 2, 2015

(51) Int. Cl.
G06Q 40/08 (2012.01)
G06Q 30/02 (2012.01)

(52) U.S. Cl.
CPC ......... *G06Q 40/08* (2013.01); *G06Q 30/0283* (2013.01)

(58) Field of Classification Search
CPC ............... G06Q 40/08; G06Q 30/0207; G06Q 30/0283; G06Q 10/0635
USPC .......................................................... 705/4
See application file for complete search history.

(56) References Cited

U.S. PATENT DOCUMENTS

| 4,651,157 A | 3/1987 | Gray |
| 5,210,854 A | 5/1993 | Beaverton |
| 5,243,530 A | 9/1993 | Stanifer |
| 5,430,432 A | 7/1995 | Camhi |

(Continued)

FOREIGN PATENT DOCUMENTS

| GB | 2286369 | 8/1995 |
| JP | H4-182868 | 6/1992 |

(Continued)

OTHER PUBLICATIONS

1988 Automobile Insurance Shoppers' Guide, published in 1988 ("Florida Guide").

(Continued)

*Primary Examiner* — Hai Tran
(74) *Attorney, Agent, or Firm* — Volpe and Koenig, P.C.

(57) ABSTRACT

A system configured to determine an insurance premium associated with an account that covers at least one vehicle and at least one driver comprising a computer memory that stores biographical information; a processor that receives information associated with telematics data associated with at least one of the vehicle(s), concerning use of the at least one vehicle(s); the processor further configured to determine discrete segments of use by at least one vehicle(s), and to determine a driver signature associated with each of the discrete segments of use; the processor further configured to generate a driver risk assessment responsive to the at least one of the discrete segments of use; the processor further configured to calculate pricing information based at least in part on the at least one risk assessment and the biographical information; and a transmitter configured to transmit the pricing information to a user device or user transmission device.

17 Claims, 17 Drawing Sheets

(56) References Cited

U.S. PATENT DOCUMENTS

| | | | |
|---|---|---|---|
| 5,438,312 A | 8/1995 | Lewis | |
| 5,446,757 A | 8/1995 | Chang | |
| 5,459,304 A | 10/1995 | Eisenmann | |
| 5,465,079 A | 11/1995 | Bouchard | |
| 5,797,134 A | 8/1998 | McMillan | |
| 6,064,970 A | 5/2000 | McMillan | |
| 6,868,386 B1 | 3/2005 | Henderson | |
| 6,957,133 B1 | 10/2005 | Hunt | |
| 7,228,211 B1 | 6/2007 | Lowrey | |
| 7,559,316 B2 | 7/2009 | Matsushita et al. | |
| 8,090,598 B2 | 1/2012 | Bauer | |
| 8,140,358 B1 | 3/2012 | Ling | |
| 8,180,655 B1 | 5/2012 | Hopkins | |
| 8,311,858 B2 | 11/2012 | Everett | |
| 8,332,242 B1* | 12/2012 | Medina, III | G06Q 40/08 705/35 |
| 8,344,849 B2 | 1/2013 | Larsson | |
| 8,466,781 B2 | 6/2013 | Miller et al. | |
| 8,738,523 B1 | 5/2014 | Sanchez et al. | |
| 8,768,560 B2* | 7/2014 | Willis | G01P 21/00 701/29.1 |
| 9,424,606 B2* | 8/2016 | Wilson, II | G06Q 10/10 |
| 2002/0111725 A1 | 8/2002 | Burge | |
| 2002/0128882 A1 | 9/2002 | Nakagawa | |
| 2005/0222730 A1 | 10/2005 | Taipale | |
| 2005/0261943 A1* | 11/2005 | Quarterman | G06Q 40/08 705/4 |
| 2009/0063174 A1* | 3/2009 | Fricke | G06Q 10/06 705/4 |
| 2010/0030586 A1 | 2/2010 | Taylor et al. | |
| 2010/0087987 A1 | 4/2010 | Huang et al. | |
| 2011/0137684 A1* | 6/2011 | Peak | G06Q 30/02 705/4 |
| 2012/0029945 A1* | 2/2012 | Altieri | G06Q 40/08 705/4 |
| 2012/0072244 A1* | 3/2012 | Collins | G06Q 10/10 705/4 |
| 2012/0074770 A1 | 3/2012 | Lee | |
| 2012/0084103 A1* | 4/2012 | Altieri | G06Q 40/08 705/4 |
| 2012/0101855 A1* | 4/2012 | Collins | G06Q 40/08 705/4 |
| 2012/0158436 A1 | 6/2012 | Bauer | |
| 2012/0209632 A1 | 8/2012 | Kaminski et al. | |
| 2012/0226421 A1 | 9/2012 | Kote et al. | |
| 2012/0303254 A1 | 11/2012 | Kirsch et al. | |
| 2013/0013347 A1 | 1/2013 | Ling | |
| 2013/0013348 A1 | 1/2013 | Ling | |
| 2013/0041521 A1 | 2/2013 | Basir et al. | |
| 2013/0073114 A1 | 3/2013 | Nemat-Nasser et al. | |
| 2013/0135118 A1 | 5/2013 | Ricci | |
| 2013/0169410 A1 | 7/2013 | Amselem | |
| 2013/0274955 A1 | 10/2013 | Rosenbaum | |
| 2013/0304519 A1* | 11/2013 | Altieri | G06Q 40/08 705/4 |
| 2013/0332024 A1 | 12/2013 | Garrett et al. | |
| 2014/0095212 A1* | 4/2014 | Gloerstad | G06Q 40/08 705/4 |
| 2015/0170287 A1* | 6/2015 | Tirone | G06Q 40/08 705/4 |

FOREIGN PATENT DOCUMENTS

| | | |
|---|---|---|
| WO | 9002388 | 3/1990 |
| WO | 2013023061 | 2/2013 |

OTHER PUBLICATIONS

1995 Consumers Guide on Automobile Insurance (Downstate), published in 1988 ("New York Guide").

"An Interest in Black Magic—Motor Technology", published Jan. 1, 1994 ("Black Magic").

"Disparate Impact and Unfairly Discriminatory Insurance Rates", Michael J. Miller, Casualty Actuarial Society E-Forum, Winter 2009.

OBD-II Background—Where'd It Come From?, http://www.OBDii.com/background.html "Where'd it come from?" hyperlink.

Excerpt from Shuji Mizutani, Car Electronics, p. 250 (Nippodenso Co. 1992).

Excerpt from David S. Boehner, Automotic Microcontrollers, in Automotive Electronics Handbook, pp. 11.24-11.29 (Ronald K. Jurgen ed,., 1995).

"Notes on Exposure and Premium Bases" by Paul Dorweiler, published May 9, 1930 ("Dorweiler").

"Communications and Positioning Systems in the Motor Carrier Industry" by Dimitris A. Scapinakis and William L. Garrison, published Jan. 1, 1992 ("Scapinakis").

"Application in GSM in High Speed Trains: Measurements and Simulations" by Manfred Goller, published May 16, 1995 ("Goller").

"AX.25 Amateur Packet-Radio Link-Layer Protocol, Version 2.0", Terry L. Fox, published Oct. 1984 ("AX.25 Specifications").

"QUALCOMM'S MSM6500 Multimedia Single-Chip Solution Enables High-Performance Multimode Handsets Supporting CDMA2000 1X, 1xEV-DO and GSM/GPRS", PR Newswire, published Nov. 12, 2002 ("MSM6500 Press Release").

Geostar, Understanding Radio Determination Satellite Service (Jane Pierce & Marilyn Finley ed.) May 1989 ("RDSS").

Geostar Corp., Annual Report (Form 10-K) (Apr. 16, 1990 ("Geostar 10-K").

"Radio Determination Satellite Service", Robert D. Briskman, Proceedings of the IEEE, vol. 78, No. 7 (Jul. 1990).

* cited by examiner

FIG. 6

Great, John, tell us a little more about yourself.

Driver 2 — Remove Driver
+ Add Another Driver

John Doe

1005 — Gender: ● Male ○ Female
1010 — Marital Status:
1015 — Birth Date: 12 | 09 | 1946
1020 — Age First Licensed: 16

Social Security Number: _____ Recommended for most accurate quote.
(Last 4 digits)   🔒 Your information is secure.

1025 — Which best describes your primary residence?

1030
Why to we ask these questions?
The information you provide here helps us provide you the most accurate quote possible.
We want to ensure your quote reflects all potential savings.

Have you lived in your current residence for 5 years or more?   ○ Yes  ○ No — 1035

Do you currently have a homeowner policy from the Hartford?   ○ Yes  ○ No — 1040

Defensive Driver course in the past 3 years?   ○ Yes  ○ No — 1045

NEXT DRIVER →

SYSTEM AND METHOD FOR DETERMINING DRIVER SIGNATURES

INCORPORATION BY REFERENCE

The following documents are incorporated herein by reference as if fully set forth: U.S. application Ser. No. 14/145,165, titled SYSTEM AND METHOD FOR EXPECTATION BASED PROCESSING filed Dec. 31, 2013; U.S. application Ser. No. 14/145,181, titled SYSTEM AND METHOD FOR DESTINATION BASED UNDERWRITING filed Dec. 31, 2013; and U.S. application Ser. No. 14/145,205, titled SYSTEM AND METHOD FOR TELEMATICS BASED UNDERWRITING filed Dec. 31, 2013. Each of the applications share common inventorship with the present application and are being filed concurrently.

BACKGROUND

Auto insurance underwriting is the process by which insurance companies determine whether to offer insurance coverage, whether to renew insurance coverage, and to determine the pricing of any coverage that is offered. Insurance pricing may be based on a rate which may then be adjusted based on discounts, credits, penalties and other adjustments. The final premium may be based on the determined risk factors associated with the driver, vehicle, laws/regulations, and other business factors.

Insurance pricing is typically derived using correlative data as a proxy for driving behavior. The proxies, such as age, driving experience, occupation, etc. may be derived from actuarial determined data. The pricing can vary depending on many factors that are believed to have an impact on the expectation of future claims and any cost associated with such future claims.

Generally, the three major factors in assessing risk may be: 1) coverage; 2) vehicle; and 3) driver. The coverage may determine the type and amount for which the insurance company may be responsible. The vehicle and driver may be important based on the statistical data that may indicate that a college educated professional driving a Lamborghini may not pose the same risk as a male high school student driving a station wagon.

In determining the pricing, the insurance company may determine the vehicle and coverage with some level of certainty. For example, the insurance company is provided with the vehicle manufacturer, model, age, value (and possibly service history) for which coverage is being requested. The insurance company may also determine the type of coverage, (e.g. liability, collision, comprehensive, personal injury protection, and uninsured motorist protection), that is being purchased.

However, the insurance company may have little data for identifying the amount of time a vehicle is being operated by a particular driver. For example, in a household with multiple drivers and multiple vehicles, neither the insurance company nor the customer may possess accurate information regarding amount of time each vehicle is used by a particular individual. Further, those individuals are assessed based on correlative data, but this may not be accurate, e.g., not all high school students drive in a similar manner.

Accordingly, methods and apparatus are described in greater detail that use telematics data to identify driver signatures associated with the use of the vehicle. The system may further be configured to identify the driver associated with the driver signatures. This may allow the insurance company to determine risk associated with offering coverage and allow the insurance company to adjust pricing to reflect the actual usage of a particular vehicle. The methods described herein may use passive and non-passive techniques to identify a driver signature associated with use of the vehicle and a driver associated with each driver signature.

SUMMARY

Systems and methods are disclosed herein for determining driver signatures. These driver signatures may be used to generate risk assessments and pricing information. During the registration phase for vehicle insurance, users identify the vehicles for which they are requesting coverage and identify the drivers of the vehicle. The systems and methods disclosed herein, allow the insurance provider to identify driver signature information, based on telematics data, which characterize how the vehicle is being driven. This information is used to generate or adjust pricing information. For example, in a two car, two driver household, if a higher risk driver is driving the more valuable vehicle, the potential for loss is greater. Accordingly, the initial assessment or price, based on biographic information without telematics data, may be reevaluated.

A system configured to determine an insurance premium associated with an account that covers at least one vehicle and at least one driver comprising a computer memory that stores biographical information; a processor that receives information associated with telematics data associated with at least one of the vehicle(s), concerning use of the at least one vehicle(s); the processor further configured to determine discrete segments of use of at least one vehicle(s), and to determine a driver signature associated with each of the discrete segments of use; the processor further configured to generate a driver risk assessment responsive to the at least one of the discrete segments of use; the processor further configured to calculate pricing information based at least in part on the at least one risk assessment and the biographical information; and a transmitter configured to transmit the pricing information to a user device or user transmission device.

BRIEF DESCRIPTION OF THE DRAWINGS

A more detailed understanding may be had from the following description, given by way of example in conjunction with the accompanying drawings wherein:

FIG. 6 is an example web page soliciting name and address information of the individual requesting an insurance;

FIG. 10 is an example web page soliciting additional driver information regarding a request for a vehicle insurance;

FIG. 11 is another example web page soliciting additional driver information regarding a request for a vehicle insurance;

DETAILED DESCRIPTION

Figure 1:
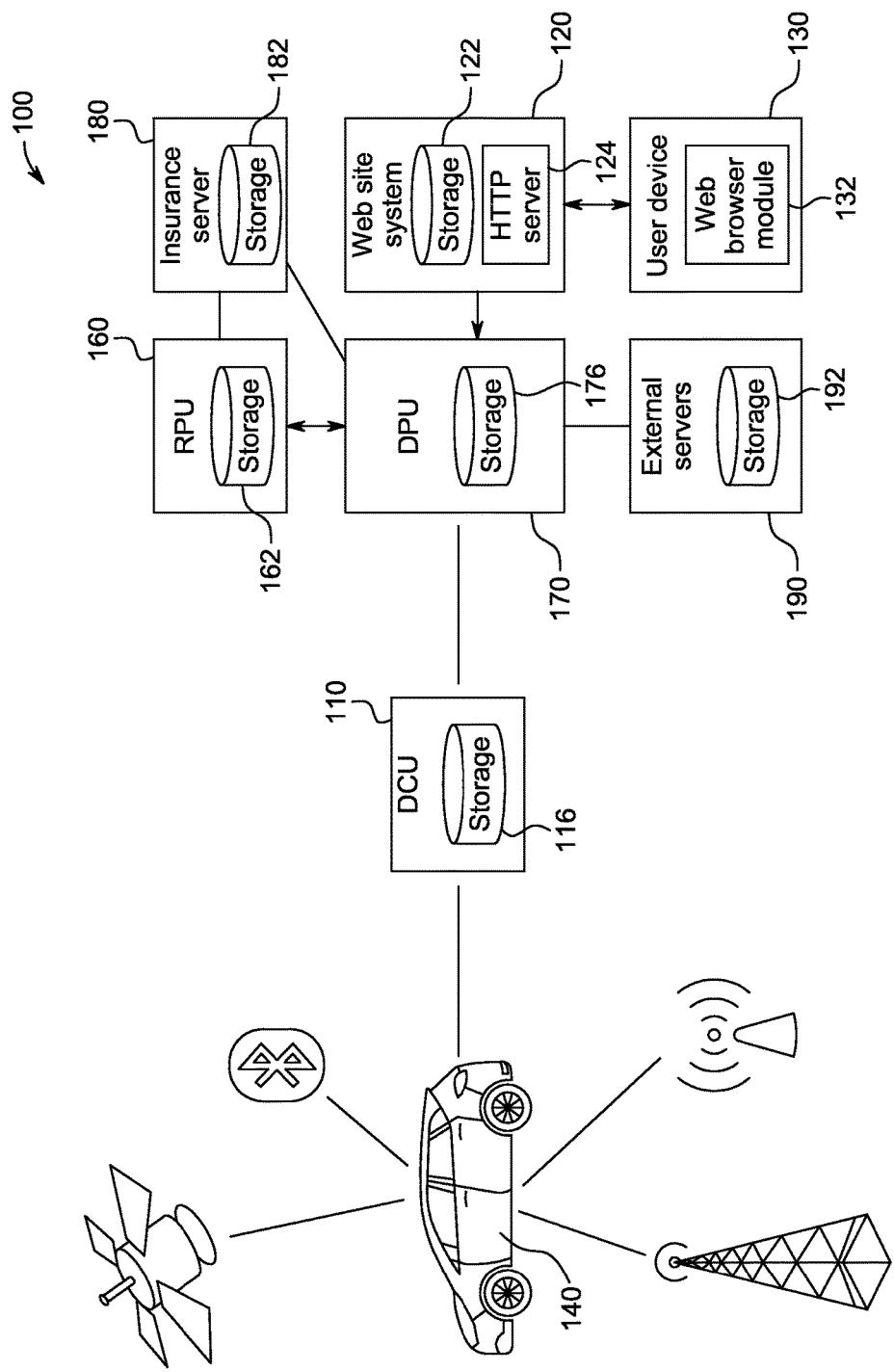
FIG. 1 shows an example system that may be used for determining driver signatures.

Disclosed herein are processor-executable methods, computing systems, and related technologies for an insurance company to determine driver signatures and to determine risk and pricing information based on those driver signatures.

For example, an insurance customer may report that a first driver drives vehicle 1 100% of the time and a second and third driver split the use of vehicle 2. In this scenario, a high school student may be the first driver, and vehicle 1 may be an older used vehicle. The parents may be the second and third drivers, driving a new model high end vehicle. The high school student may drive the older vehicle to and from school, but use a parent's vehicle at night to meet friends. Alternatively, the high school student may frequently use the parent's vehicle on weekends. Whether that high school student is an excellent driver, initial pricing may be based upon the correlation of high school drivers and higher expected losses. In one example, an insurance company may generate pricing information on a worst case scenario, wherein the high school student drives the more expensive vehicle 100% of the time. In another example, the insurance company may generate pricing information based on a blended average of expected vehicle usage.

If an insurance company was able to determine how the vehicle is actually used, the insurance company may be able to apply causal data to the pricing analysis, and generate adjusted pricing information. Methods and apparatus described herein allow the insurance company to use telematics data and/or driver settings to determine driver signatures associated with each vehicle's use. These driver signatures may be used to determine the manner in which each vehicle is used. Further, these driver signatures may be used to determine the number of unique signatures associated with each vehicle. The system may assign an identity for each of the unique driving signatures for each vehicle. The system may further be configured to categorize driving segments as being driven by impaired drivers, unregistered drivers, or automatic (vehicle controlled) drivers. These driver signatures may be used for underwriting, pricing, claims, and fraud (Special Investigations Unit (SIU)) applications. This may include adjusting pricing information during scheduled insurance renewal periods as well as proactively adjusting pricing information based on exposure changes.

These exposure changes may include the addition or subtraction of a vehicle or drivers. The system may further be configured to determine that the individual or aggregate driver signatures have changed; this change may be compared to a threshold. Based on this comparison, the system may proactively adjust the pricing information.

In one embodiment, the driver signature information, determined based on telematics data, may be used to adjust insurance pricing information. For example, based on the usage of each vehicle, the system may adjust the insurance rate, provide a discount, or it may be used to credit or penalize the account. Because use of driver signatures may affect pricing, the uncertainty may cause individuals to be reluctant to join the program. Accordingly, the system may be configured to provide a discount to drivers that sign up for this program. Or it may be required for all vehicles for a household with high risk drivers. In another example, a user requesting a quote may be asked to provide telematics information prior to receiving a quote.

FIG. 1 shows an example system 100 that may be used for determining driver signatures and to use those driver signatures to determine risk and pricing information. The example system 100 includes a vehicle 140 equipped with one or more telematics devices (not pictured), for example a TrueLane® device. The telematics devices may further include smartphones, tablets, laptops, OEM connectivity devices and similar devices. The vehicle 140 may be in communication with multiple devices over different networks, including a satellite, a cellular station, a WI-FI hotspot, BLUETOOTH devices, and a data collection unit (DCU) 110. The DCU 110 may be operated by a third party vendor that collects telematics data or by the insurance company. The DCU 110 may include storage 116. The DCU 110 collects the telematics data and may then transmit the telematics data to a data processing unit (170). The telematics data may be communicated to the DPU 170 in any number of formats. The telematics data may be transmitted as raw data, it may be transmitted as summary data, or it may be transmitted in a format requested by the DPU 170. The DPU 170 may also be configured to communicate with a risk and pricing unit (RPU) 160 including storage 162, internal insurance servers 180, including storage 182, and external servers 190 (e.g. social media networks, official/government networks), which are all connected by one or more networks.

The one or more telematics devices associated with the vehicle 140 may communicate with a satellite, Wi-Fi hotspot, BLUETOOTH devices and even other vehicles. The telematics devices associated with the vehicle 140 may report this information to the DCU 110. As will be described in greater detail hereafter, the DCU 110 may transmit a version of the telematics data to the DPU 170 which may be configured to consolidate a combination of stored biographical data, demographic data, and data available from external networks with the telematics data to generate driver signature information.

The web site system 120 provides a web site that may be accessed by a user device 130. The web site system 120 includes a Hypertext Transfer Protocol (HTTP) server module 124 and a database 122. The HTTP server module 124 may implement the HTTP protocol, and may communicate Hypertext Markup Language (HTML) pages and related data from the web site to/from a user device 130 using HTTP. The web site system 120 may be connected to one or more private or public networks (such as the Internet), via which the web site system 120 communicates with devices such as the user device 130. The web site system 120 may generate one or more web pages communication setting information, may communicate the web pages to the user device 130, and may receive responsive information from the user device 130.

The HTTP server module 124 in the web site system 120 may be, for example, an APACHE HTTP server, a SUN-ONE Web Server, a MICROSOFT Internet Information Services (IIS) server, and/or may be based on any other appropriate HTTP server technology. The web site system 120 may also include one or more additional components or modules (not depicted), such as one or more load balancers, firewall devices, routers, switches, and devices that handle power backup and data redundancy.

The user device 130 may be, for example, a cellular phone, a desktop computer, a laptop computer, a tablet computer, or any other appropriate computing device. The user device 130 may further be configured to operate as a telematics device. The user device 130 includes a web browser module 132, which may communicate data related to the web site to/from the HTTP server module 124 in the web site system 120. The web browser module 132 may include and/or communicate with one or more sub-modules that perform functionality such as rendering HTML (including but not limited to HTML5), rendering raster and/or vector graphics, executing JavaScript, and/or rendering multimedia content. Alternatively or additionally, the web browser module 132 may implement Rich Internet Application (RIA) and/or multimedia technologies such as ADOBE FLASH, MICROSOFT SILVERLIGHT, and/or other technologies. The web browser module 132 may implement RIA and/or multimedia technologies using one or more web browser plug-in modules (such as, for example, an ADOBE FLASH or MICROSOFT SILVERLIGHT plug-in), and/or using one or more sub-modules within the web browser module 132 itself. The web browser module 132 may display data on one or more display devices (not depicted) that are included in or connected to the user device 130, such as a liquid crystal display (LCD) display or monitor. The user device 130 may receive input from the user of the user device 130 from input devices (not depicted) that are included in or connected to the user device 130, such as a keyboard, a mouse, or a touch screen, and provide data that indicates the input to the web browser module 132.

The example system 100 of FIG. 1 may also include one or more wired and/or wireless networks (not depicted), via which communications between the elements in the example system 100 may take place. The networks may be private or public networks, and/or may include the Internet.

Each or any combination of the modules shown in FIG. 1 may be implemented as one or more software modules, one or more specific-purpose processor elements, or as combinations thereof. Suitable software modules include, by way of example, an executable program, a function, a method call, a procedure, a routine or sub-routine, one or more processor-executable instructions, an object, or a data structure. In addition or as an alternative to the features of these modules described above with reference to FIG. 1, these modules may perform functionality described herein with reference to FIGS. 2-16.

Figure 2:
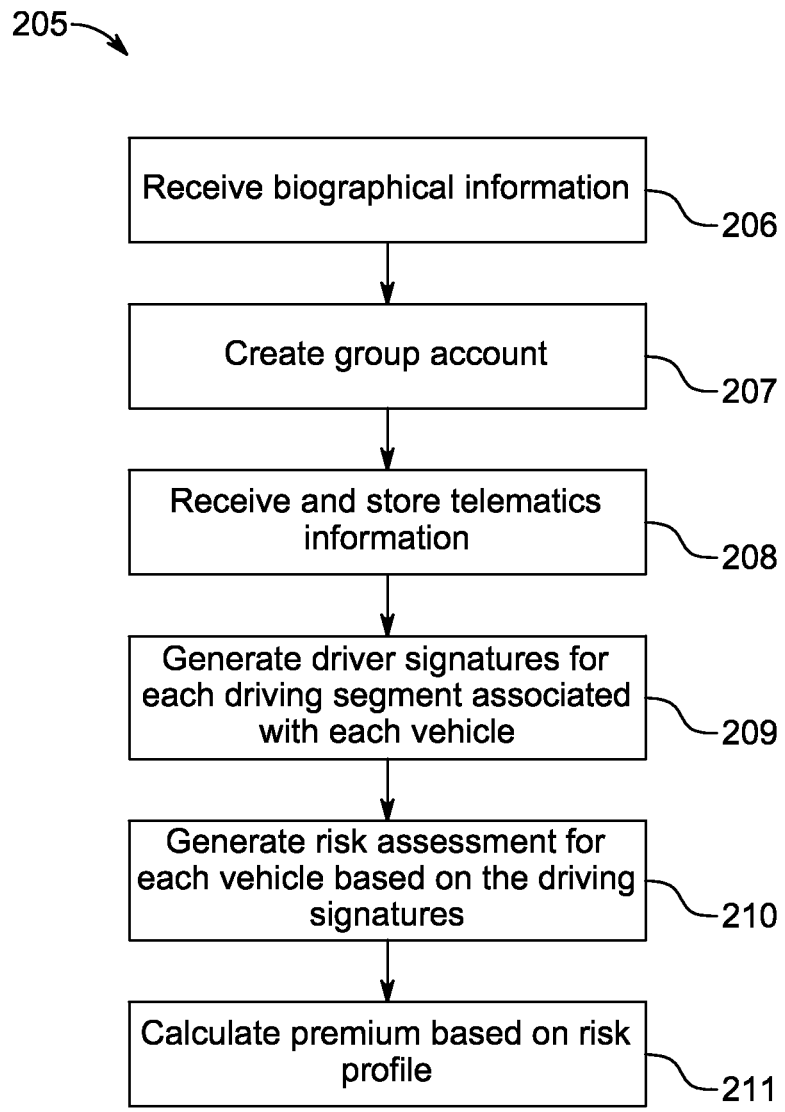
FIG. 2 shows a flow diagram for a method for determining pricing based on driver signatures associated with a vehicle.

FIG. 2 shows an example use case for method 205 for determining driver signatures. The system 100 receives biographical information regarding the user (step 206). This information may include information (such as the number of family members, age, marital status, education, address information, number and type of vehicles). Based on this information, the system 100 may create a group account (step 207). The group account may include subaccounts for each vehicle, wherein each vehicle may have multiple drivers. For each vehicle, the system 100 may create a use profile. Wherein the use profile is based on the indicated amount of use of each vehicle, by each driver. The system 100 may use correlative data based on stored information (including historic driver data associated with each driver, statistical/demographic information, biographical data) and other actuarial factors to determine a risk assessment associated with insuring each vehicle. Wherein this risk assessment may include expected claims and/or losses associated with the vehicle. The system 100 may use this risk assessment to determine pricing information for the account. This initial risk assessment may be based on correlative data (i.e. using the biographic/demographic data as a proxy for actual driving behavior.) This may include driver risk assessment, vehicle risk assessment, policy risk assessment or any appropriate risk assessment. The risk assessment may be represented as a profile, a score (or set of scores) or similar information stored in a database. Once the system 100 has generated the group account, it may begin to receive and store the vehicles' telematics data (step 208). The system 100 may use software based algorithms to analyze received telematics data. For example, the system 100 may be configured to cluster certain driver characteristics in the telematics data to identify discrete segments of use associated with a particular driver signature. The system 100 may be configured to associate each of these driver signatures with a driver (known or unknown) (step 209). The system 100 may then categorize the usage of each vehicle based on these driver signatures. In one example, the system 100 may determine the amount of time each vehicle is used by driver signatures associated with known and unknown drivers. The system 100 may adjust the risk assessment associated with the vehicle based on the number of driver signatures identified as well as an analysis of the type of driving the driver signature indicates (e.g. aggressive, distracted, cautious, etc.) (step 210). The risk assessment, generated by the system 100, may be a risk profile associated with the vehicle or the driver.

Alternatively, the system 100 may be configured to generate an aggregate risk profile for the group of vehicles, without individually assessing each driver or vehicle. Based on these driver signatures, the system 100 may be configured to assess the risks associated with coverage based on causal data in addition to or instead of correlative data. The system 100 may use these risks to adjust the pricing information (step 211). The pricing information may be adjusted by adjusting the assessed rate, or providing the customer with a discount, a credit or a penalty. In another example, the pricing information may be adjusted by placing the vehicle or driver in a different rate category.

FIGS. 3-13 show example web pages that may be displayed by the web browser module 132. As will be described in detail below, the web pages may include display elements which allow the user of the user device 130 to interface with the system 100 and register or receive a quote for vehicle insurance. The web pages may be included in a web browser window 200 that is displayed and managed by the web browser module 132. The web pages may include data received by the web browser module 132 from the web site system 120. The web pages may include vehicle insurance information.

The web browser window 200 may include a control area 265 that includes a back button 260, forward button 262, address field 264, home button 266, and refresh button 268. The control area 265 may also include one or more additional control elements (not depicted). The user of the user device 130 may select the control elements 260, 262, 264, 266, 268 in the control area 265. The selection may be performed, for example, by the user clicking a mouse or providing input via keyboard, touch screen, and/or other type of input device. When one of the control elements 260, 262, 264, 266, 268 is selected, the web browser module 132 may perform an action that corresponds to the selected element. For example, when the refresh button 268 is selected, the web browser module 132 may refresh the page currently viewed in the web browser window 200.

Figure 3:
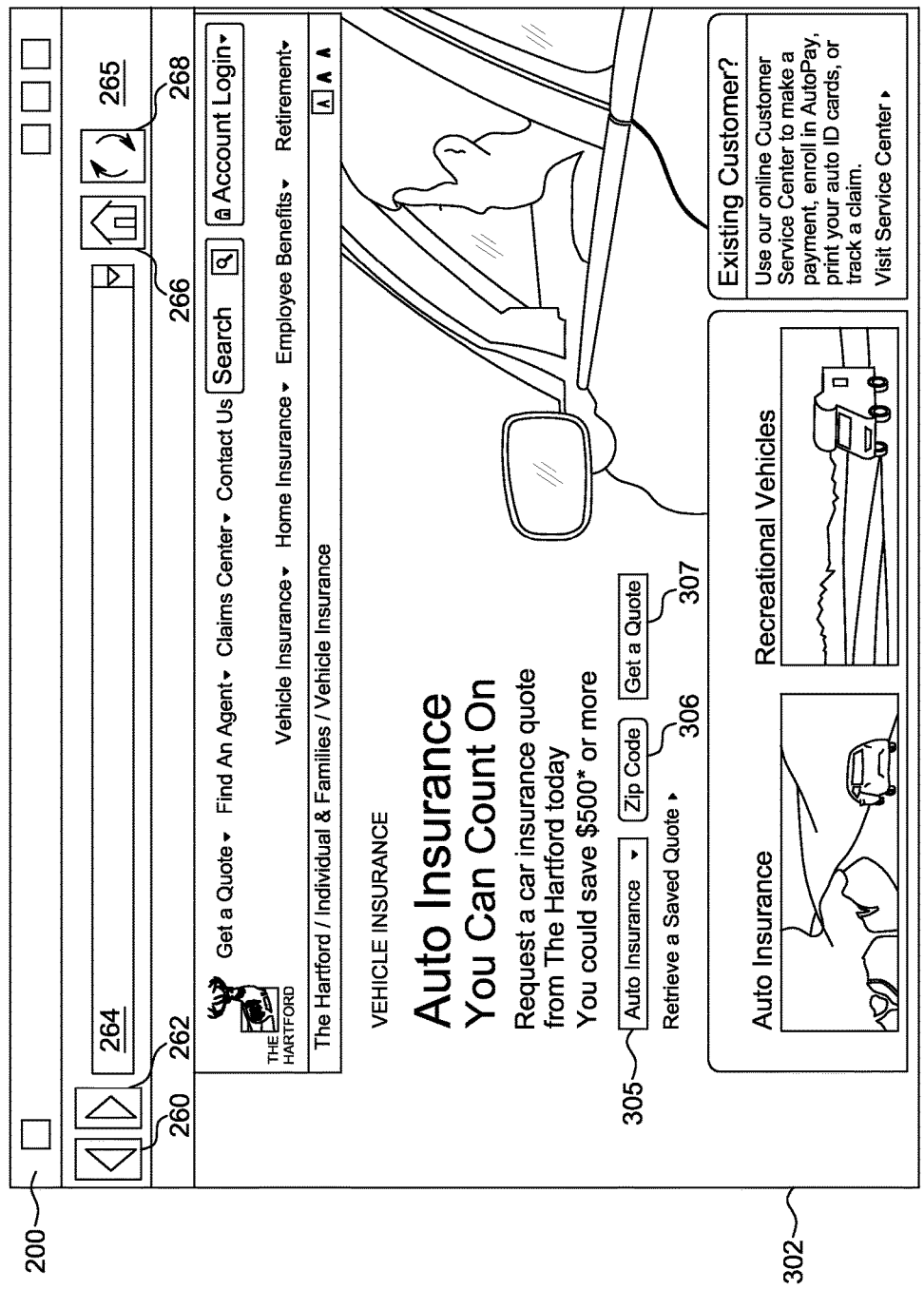
FIG. 3 is an example web page for initiating a request for a vehicle insurance quote.

FIG. 3 is an example web page 302 for initiating a request for a vehicle insurance quote. As shown in FIG. 3, the web page 302 may include questions accompanied by multiple input fields 305-307 in the form of drop down lists, text fields, and radio buttons. As the user provides input into the input fields 305-307, the web browser module 132 may store one or more data structures ("response data") that reflect the selections made in the input fields 305-307. Further, as the selections are updated, the web browser module 132 may update the web page 302 to indicate additional or more specific questions that may be associated with the selections. If there are no errors in the transmission, the web browser module 132 is directed to a subsequent web page. While the example shown is for auto insurance, the methods and apparatus disclosed herein may be applied to any vehicle insurance, e.g. boats, planes, motorcycles etc. Also, while the examples are directed to family auto insurance, the methods and apparatus disclosed herein may be applicable to corporate insurance plans, or any policies covering vehicles.

Figure 4:
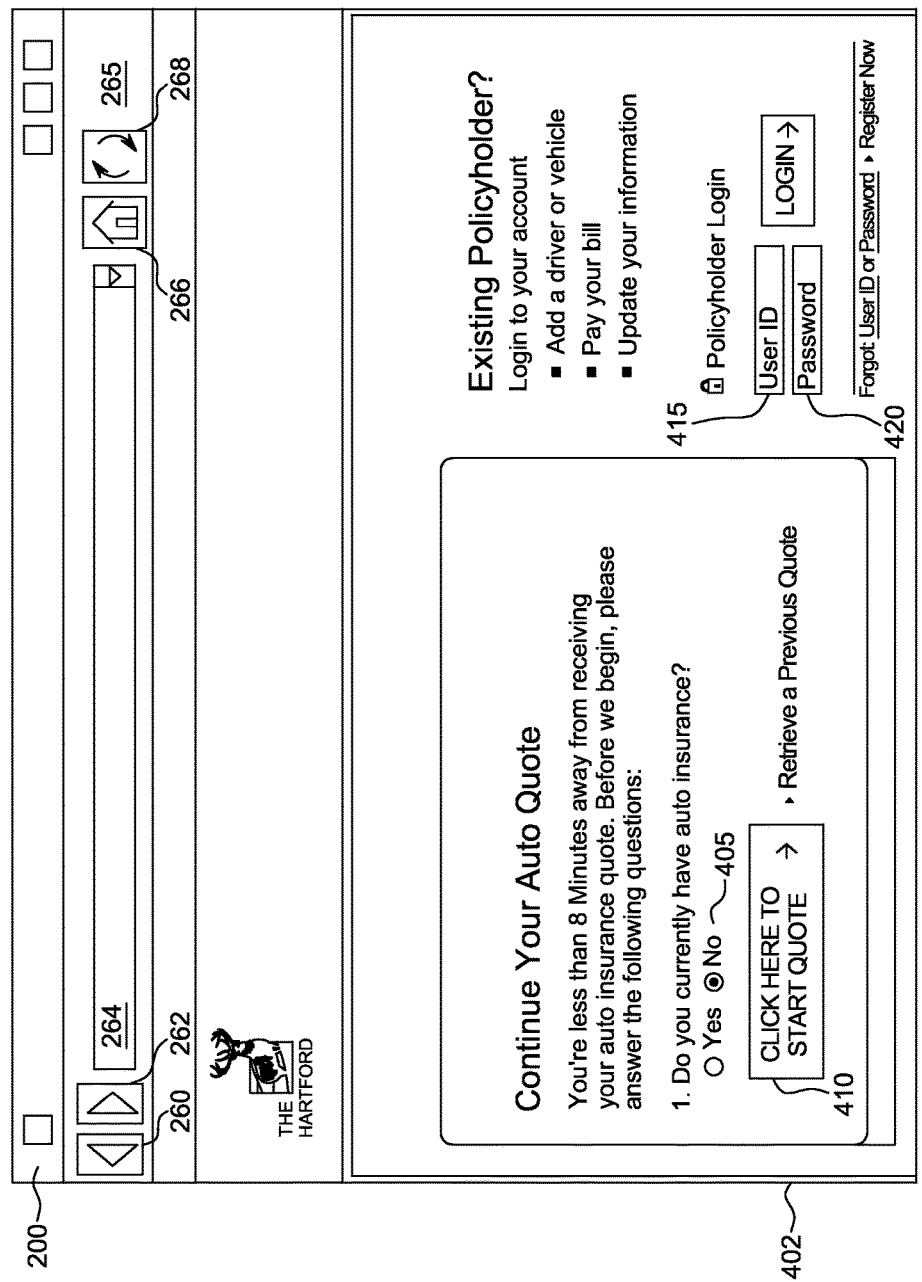
FIG. 4 is an example web page soliciting preliminary information regarding a request for a vehicle insurance.

FIG. 4 is an example web page 402 soliciting preliminary information regarding a request for a vehicle insurance quote. As shown in FIG. 4, the web page 402 may include multiple input fields 405, 410, 415, and 420. As the user device 130 receives input for the input fields, the web browser module 132 may store one or more data structures ("response data") that reflect the selections made in the input fields. Further, as the selections are updated, the web browser module 132 may update the web page 402 to indicate additional or more specific questions that may be associated with the selections. At any time, while viewing the web page 402 of FIG. 4, the user may enter user identification information in input fields 415 and 420, which accesses previously stored information associated with the user. If there are no errors in the transmission, the web browser module 132 is directed to a subsequent web page.

Figure 5:
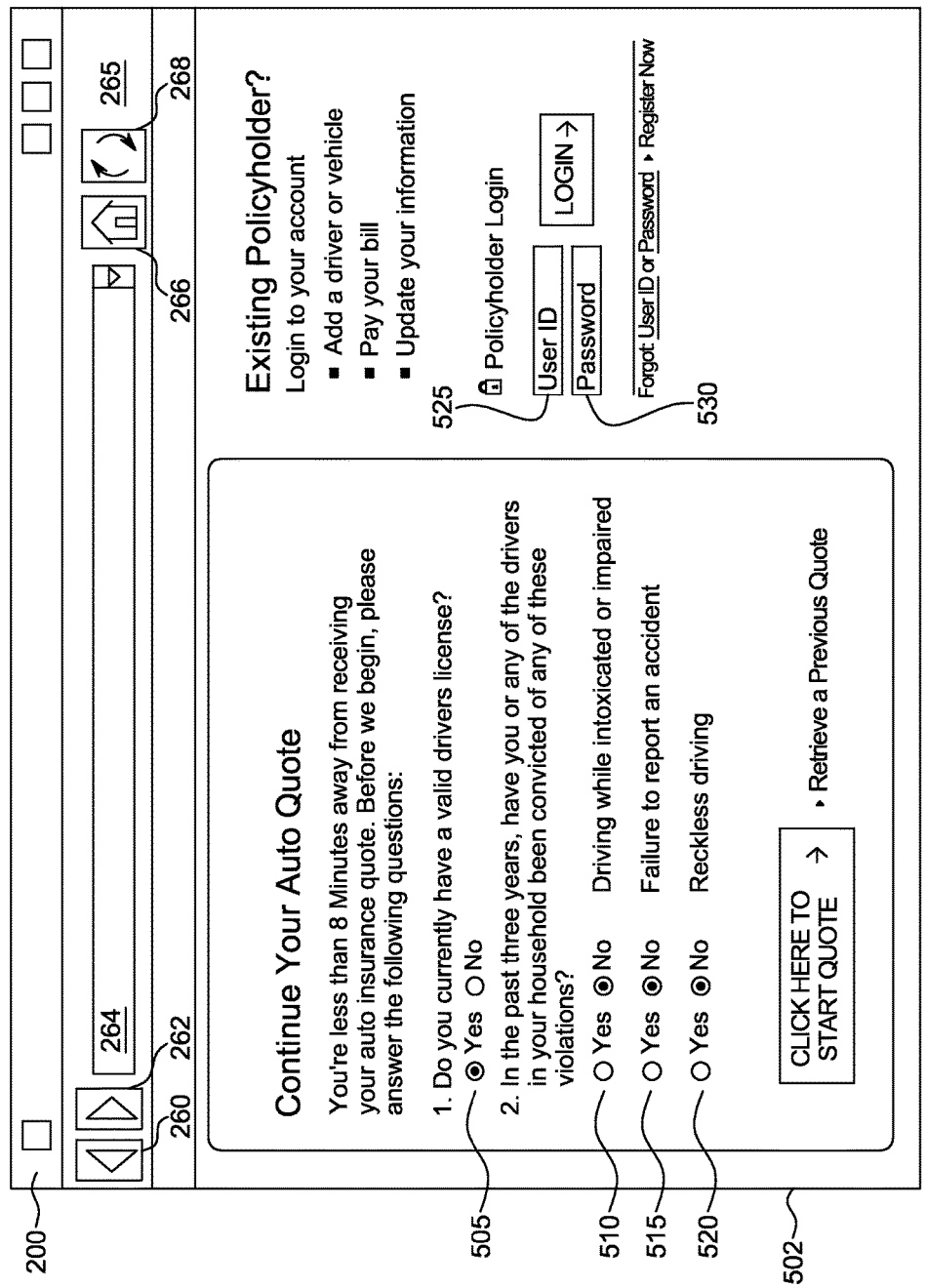
FIG. 5 is an example web page soliciting additional preliminary information regarding a request for a vehicle insurance.

FIG. 5 is an example web page 502 soliciting additional preliminary information regarding a request for a vehicle insurance quote. As shown in FIG. 5, the web page 502 may include multiple input fields 505, 510, 515, 520, 525, and 530. As the user device 130 receives input for the input fields, the web browser module 132 may store one or more data structures ("response data") that reflect the selections made in the input fields. Further, as the selections are updated, the web browser module 132 may update the web page 502 to indicate additional or more specific questions that may be associated with the selections. At any time, while viewing the web page 502 of FIG. 5, the user may enter user identification information in input fields 525 and 530, which accesses previously stored information associated with the user. Web page 502 solicits additional questions, for example, whether the user currently has a valid driver's license and whether the user or associated family has had any major driving violations. Such violations alert the system 100 that the user may be directed to a different insurance product. Additionally, while the telematics program is voluntary for some users, in one embodiment, a potential user may be eligible for additional products if they consent to using the telematics program, whereas previously they may have been disqualified. If there are no errors in the transmission, the web browser module 132 is directed to a subsequent web page.

Figure 6:
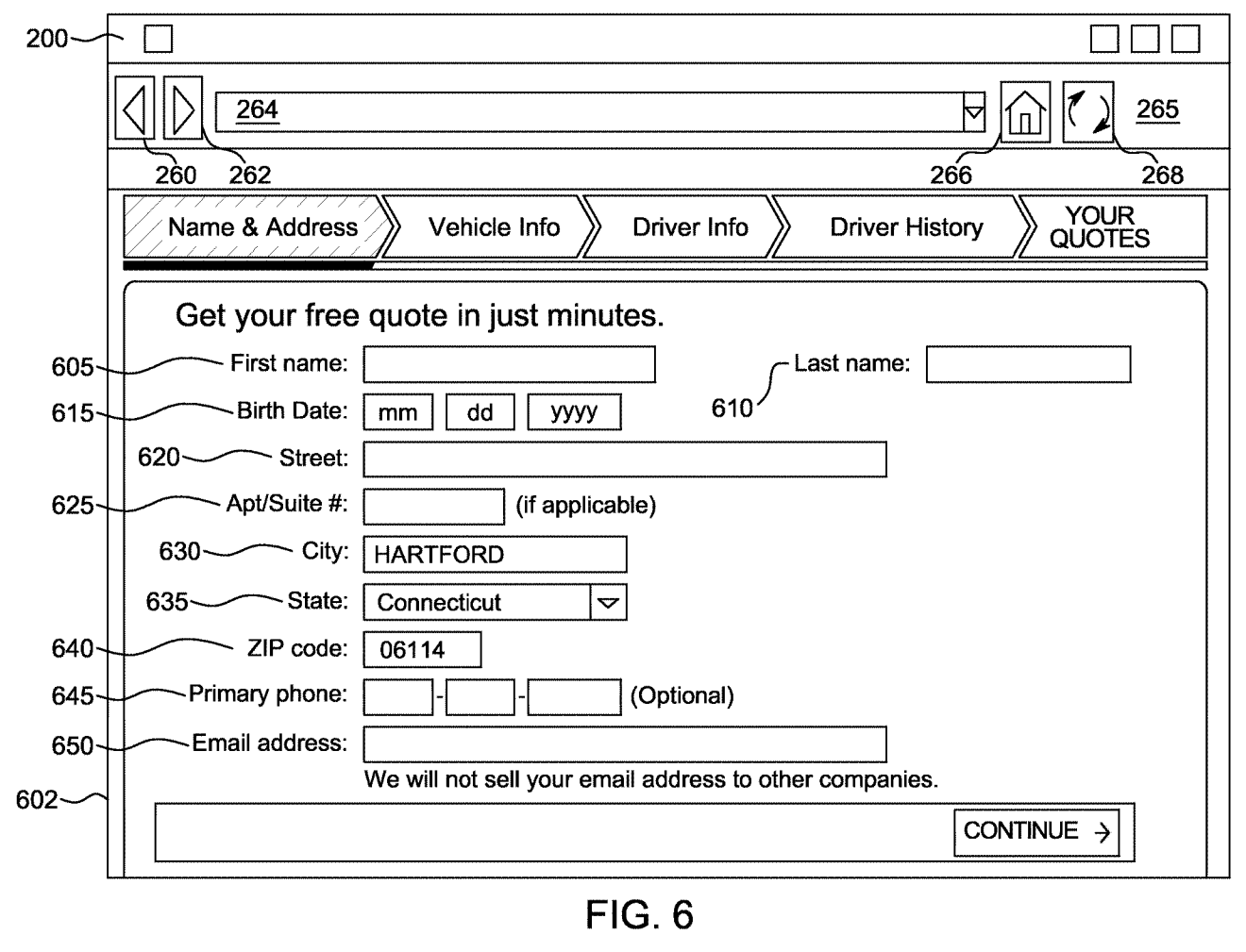

FIG. 6 is an example web page 602 soliciting name and address information of the individual requesting an insurance quote. As shown in FIG. 6, the web page 602 may include multiple input fields 605, 610, 615, 620, 625, 630, 635, 640, 645 and 650. As the user device 130 receives input for the input fields, the web browser module 132 may store one or more data structures ("response data") that reflect the selections made in the input fields. Further, as the selections are updated, the web browser module 132 may update the web page 602 to indicate additional or more specific questions that may be associated with the selections. The questions displayed on web page 602 solicit questions regarding the contact information of the individual applying for insurance. As an example, the questions shown in FIG. 6 include: name, date of birth, address, phone number, and email address. If there are no errors in the transmission, the web browser module 132 is directed to a subsequent web page.

Figure 7:
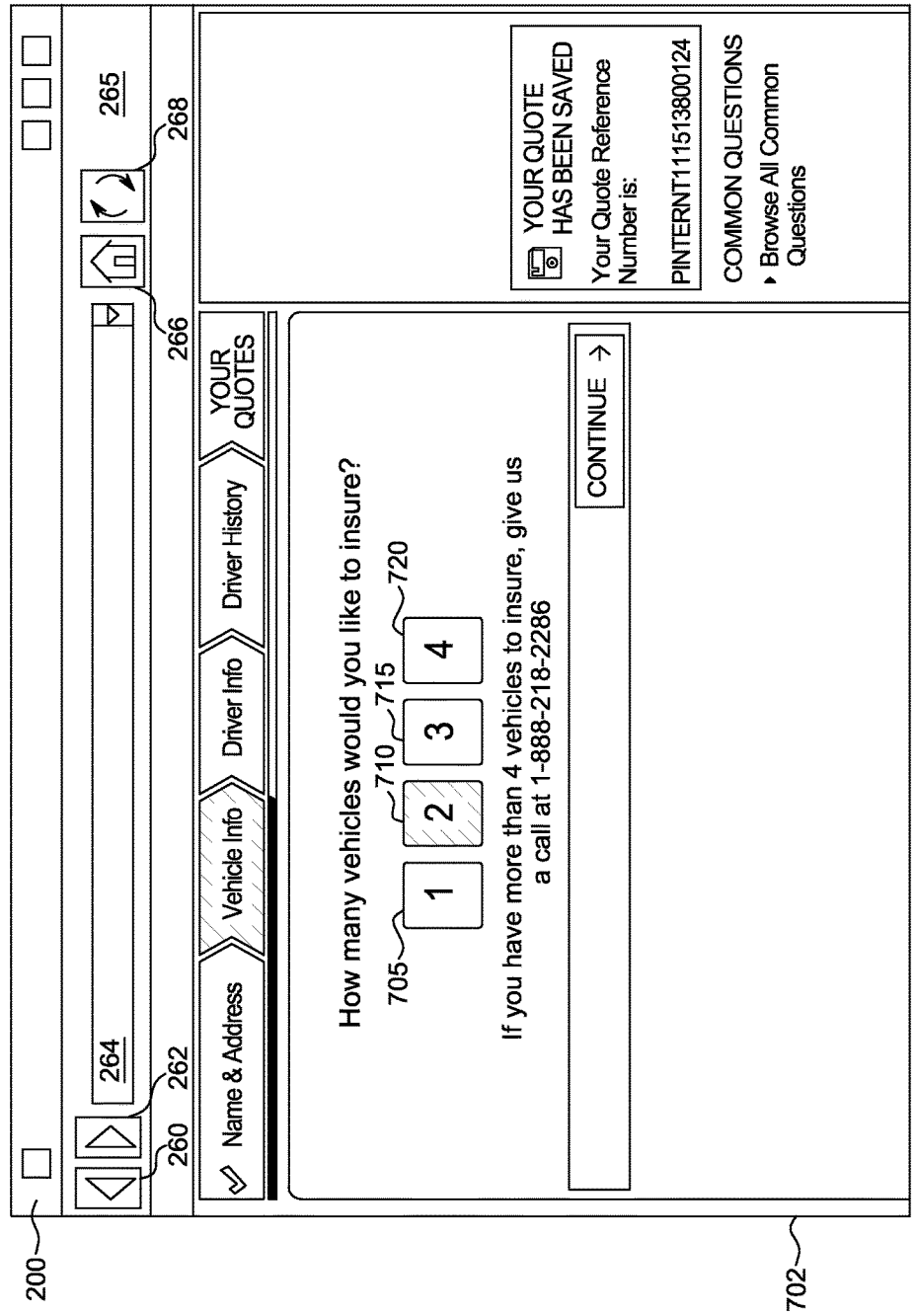
FIG. 7 is an example web page soliciting vehicle information regarding a request for a vehicle insurance.

FIG. 7 is an example web page 702 soliciting vehicle information regarding a request for a vehicle insurance quote. As shown in FIG. 7, the web page 702 may include radio buttons 705, 710, 715, and 720. As the user device 130 receives input selecting a radio button, the web browser module 132 may store one or more data structures ("response data") that reflect the selections made. Further, as the selections are updated, the web browser module 132 may update the web page 702 to indicate additional or more specific questions that may be associated with the selections. The question displayed on web page 702 solicits information regarding the number of vehicles for which insurance is being requested. While the example shown in FIG. 7 only allows four vehicles, this is as an example only. More or less vehicles may be allowed. If there are no errors in the transmission, the web browser module 132 is directed to a subsequent web page.

Figure 8:
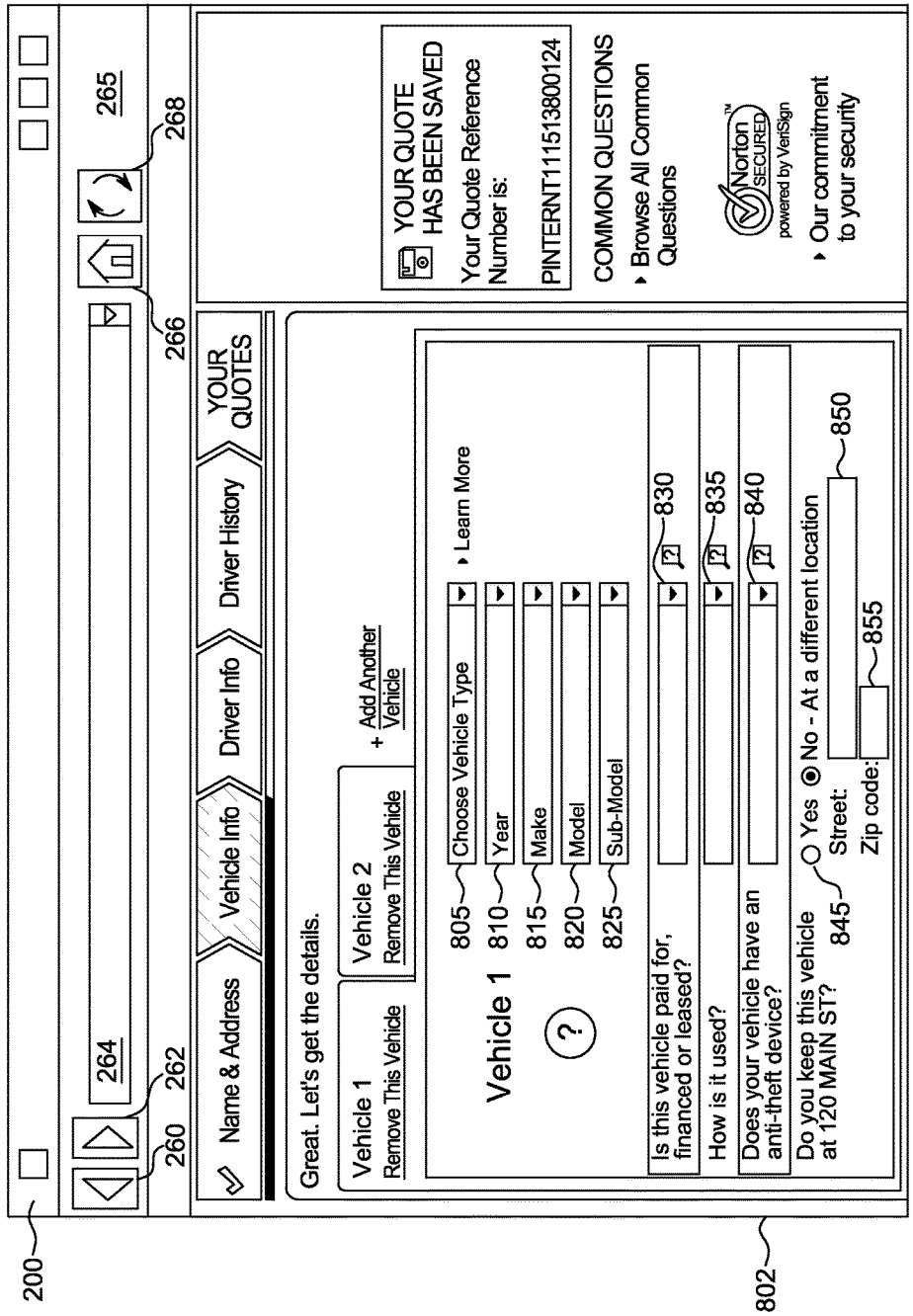
FIG. 8 is an example web page soliciting additional vehicle information regarding a request for a vehicle insurance quote.

FIG. 8 is an example web page 802 soliciting additional vehicle information regarding a request for a vehicle insurance quote. As shown in FIG. 8, the web page 802 may include radio buttons 805-855, for example, radio buttons Choose Vehicle Type 805, Year 810, Make 815, Model 820, Sub-Model 825, is this vehicle paid for, financed or leased? 830, How Is It used 835, Does your vehicle have an anti-theft device? 840, Yes or No—At a different location 845, Street 850 and Zip code 855. As the user device 130 receives inputs, the web browser module 132 may store one or more data structures ("response data") that reflect the selections made. Further, as the selections are updated, the web browser module 132 may update the web page 802 to indicate additional or more specific questions that may be associated with the input. The question displayed on web page 802 solicits information regarding when the user is requested to enter vehicle type, year, make, model, and other information. The user is also requested to enter information as to how the vehicle is paid for, how the vehicle is used, whether there is anti-theft equipment, and where the vehicle is stored. The web page 802 also includes tabs to add data for additional vehicles and to remove vehicles. If there are no errors in the transmission, the web browser module 132 is directed to a subsequent web page.

Figure 9:
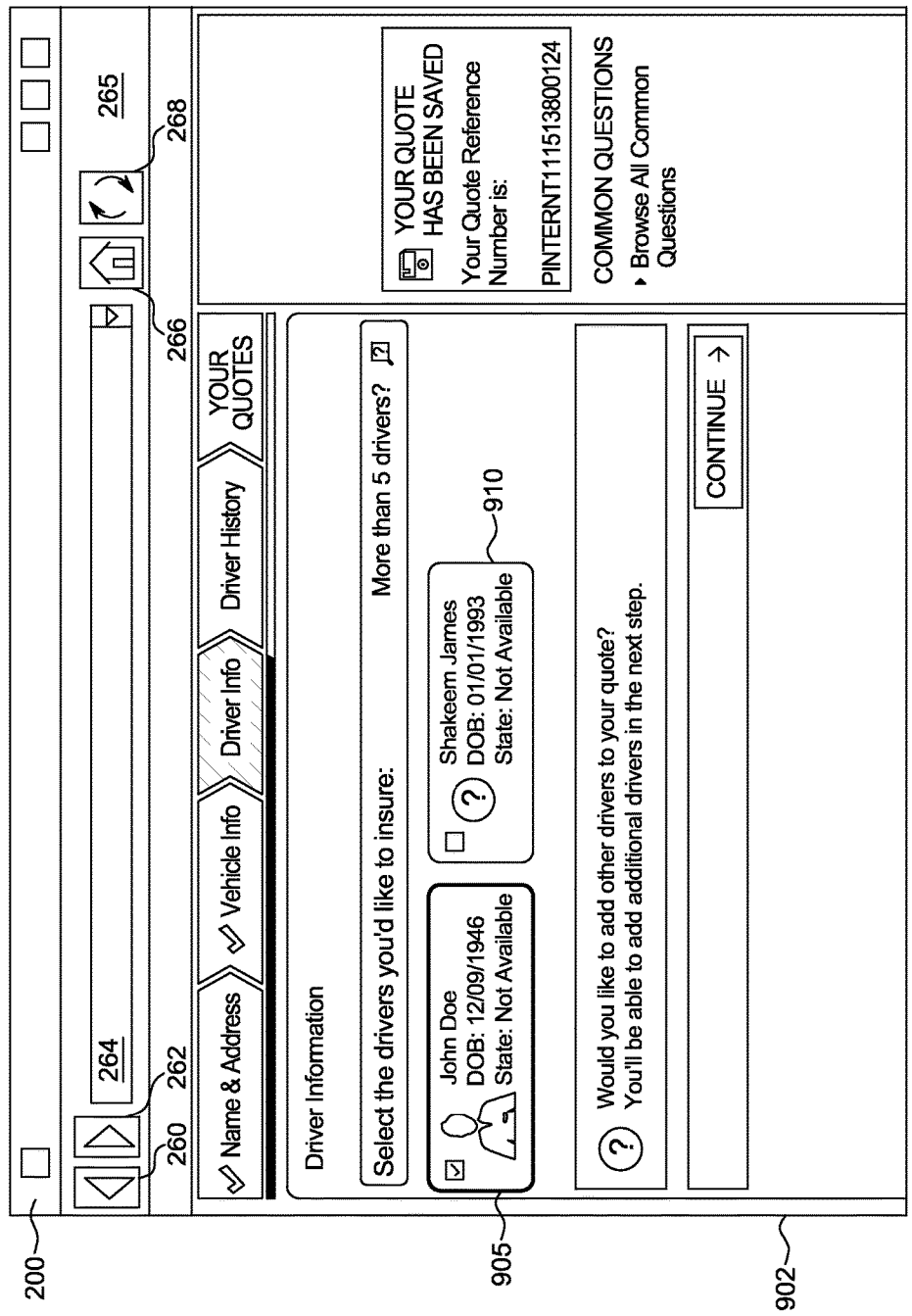
FIG. 9 is an example web page soliciting driver information regarding a request for a vehicle insurance.

FIG. 9 is an example web page 902 soliciting driver information regarding a request for a vehicle insurance quote. As shown in FIG. 9, the web page 902 may include radio buttons 905 and 910. As the user device 130 receives inputs, the web browser module 132 may store one or more data structures ("response data") that reflect the selections made. Further, as the selections are updated, the web browser module 132 may update the web page 902 to indicate additional or more specific questions that may be associated with the input. The question displayed on web page 902 solicits information regarding the identity of vehicle(s) for which insurance is being requested. Radio button 905 for example, contains information that is generated based on the user information entered via web page 902. Additionally, the system 100 may be configured to access data associated with the address information and determined suggested drivers, as shown in radio button 910. If there are no errors in the transmission, the web browser module 132 is directed to a subsequent web page.

FIG. 10 is an example web page 1002 soliciting additional driver information regarding a request for a vehicle insurance quote. As shown in FIG. 10, the web page 1002 may include input fields 1005-1045, for example, input fields Gender 1005, Marital Status 1010, Birth Date 1015, Age First Licensed 1020, Social Security Number 1025, Which best describes your primary residence 1030, Have you lived in your current residence for 5 years or more 1035, Do you currently have a homeowner policy from the Hartford? 1040, and Defensive Driver course in the past 3 years? 1045. As the user device 130 receives inputs, the web browser module 132 button may store one or more data structures ("response data") that reflect the selections made. Further, as the selections are updated, the web browser module 132 may update the web page 1002 to indicate additional or more specific questions that may be associated with the input. The question displayed on web page 1002 solicits information regarding the identity of vehicle(s) for which insurance is being requested. The system 100 may have access to additional database information to confirm or auto-fill information in the web page 1002. For example, based on the user's social security number, the system 100 may determine background information or confirm the identity. Web page 1002 allows the user to enter all of the additional drivers to be insured, along with their corresponding information. Additional information may also be requested, for example, for example, height, weight, cell phone number, employment information. The system 100 may further be configured to access information, for example from the local department of motor vehicles. This may enable the insurance company to access height and weight information, which may be used for driver signature identification as described in greater detail below. If there are no errors in the transmission, the web browser module 132 is directed to a subsequent web page.

Figure 11:
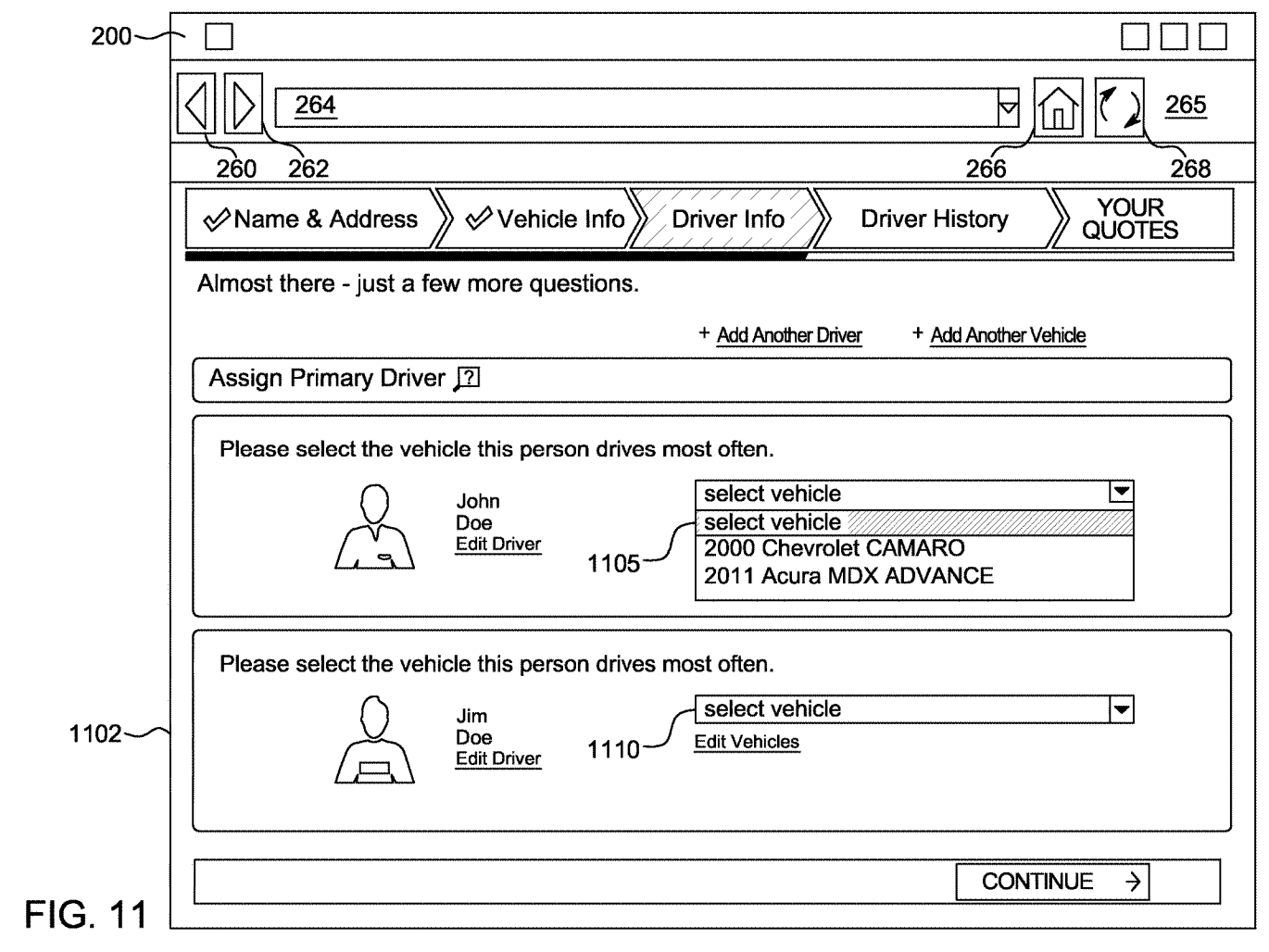

FIG. 11 is another example web page 1102 soliciting additional information regarding a request for a vehicle insurance quote. As shown in FIG. 11, the web page 1102 may include dropdown menus 1105 and 1110. As the user device 130 receives inputs, the web browser module 132 may store one or more data structures ("response data") that reflect the selections made. Further, as the selections are updated, the web browser module 132 may update the web page 1102 to indicate additional or more specific questions that may be associated with the input. The question displayed on web page 1102 solicits information regarding the primary vehicles being driven by each driver. If there are no errors in the transmission, the web browser module 132 is directed to a subsequent web page.

Figure 12:
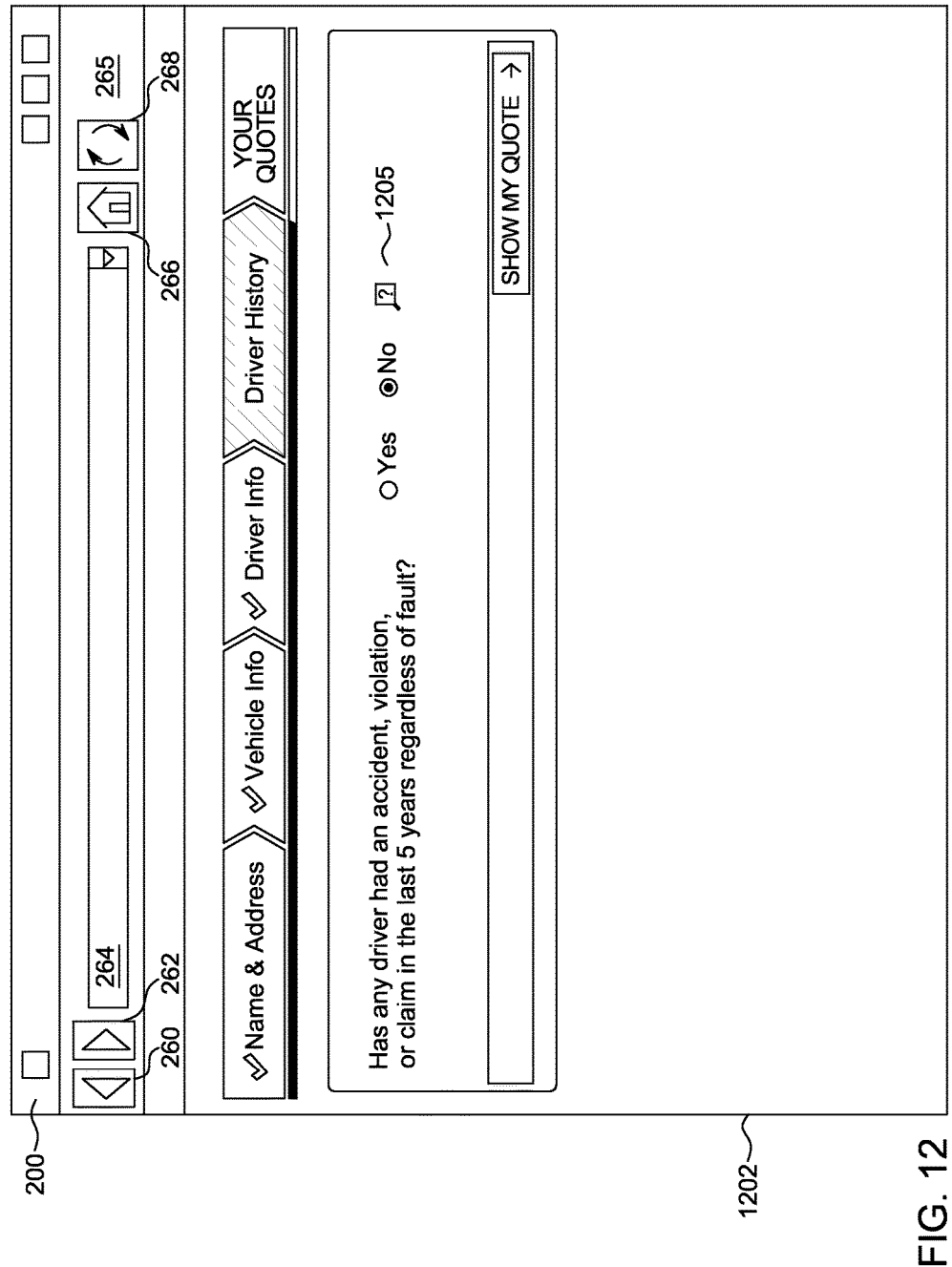
FIG. 12 is an example web page soliciting driver history information regarding a request for a vehicle insurance.

FIG. 12 is an example web page 1202 soliciting driver history information regarding a request for a vehicle insurance quote. As shown in FIG. 12, the web page 1202 may include radio button 1205. As the user device 130 receives inputs, the web browser module 132 may store one or more data structures ("response data") that reflect the selections made. Further, as the selections are updated, the web browser module 132 may update the web page 1202 to indicate additional or more specific questions that may be associated with the input. The question displayed on web page 1202 solicits information regarding the driver history for each of the drivers. If there are no errors in the transmission, the web browser module 132 is directed to a quote.

Figure 13:
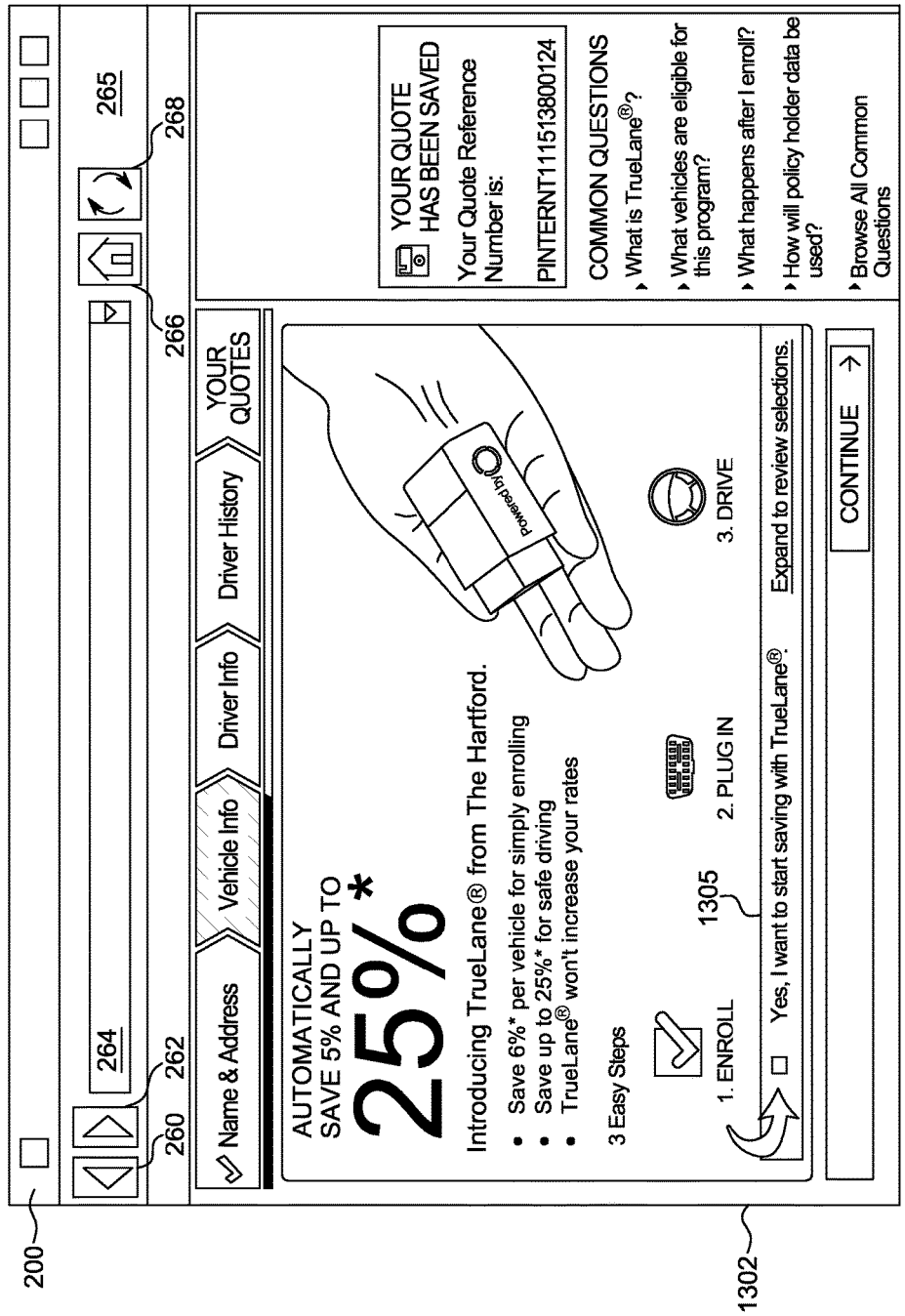
FIG. 13 is an example web page soliciting a response from the user for registration to TrueLane® telematics program.

FIG. 13 is an example web page 1302 soliciting a response from the user for registration to TrueLane® telematics program. As shown in FIG. 13, the web page 1302 may include a radio button 1305. As the user device 130 receives inputs, the web browser module 132 may store one or more data structures ("response data") that reflect the selections made. Further, as the selections are updated, the web browser module 132 may update the web page 1302 to indicate additional or more specific questions that may be associated with the input. Based on the previous answers supplied by the user, the system 100 determines whether the user is eligible for the TrueLane® discount. Alternatively, if the driver or vehicle is in a higher risk category, TrueLane® may be required in order to receive or maintain insurance coverage. The question displayed on web page 1302 confirms enrollment in the TrueLane® telematics program. If there are no errors in the transmission, the web browser module 132 is directed to a subsequent web page where a quote may be provided.

While the below examples describe a scenario wherein a new customer registers for insurance and then the system 100 adjusts the pricing information based on telematics data. The systems and methods described herein may be applied to current and former customers who are looking to renew their coverage. In this scenario, the biographical information and historical driver information may already be stored on the insurance server 180, and the DPU 170 may access this information directly.

During the registration phase, the system 100 receives biographical information about each of the vehicles and the expected drivers for each vehicle and the percentage each driver is expected to use each vehicle. This may be used as a baseline to create vehicle profiles.

The inside of vehicle 140, may include a plurality of electronics devices that may communicate information to the telematics device. The vehicle 140 may include a microprocessor and memory that may operatively connect to each individual electronic device. For example, there may be electronic devices associated with the seats, A/C units, global positioning satellite (GPS)/stereo system, DVD unit, and BLUETOOTH equipment. The microprocessor may also be in communication with the headlights, engine, traffic signals, rear view mirror, rearview cameras, cruise control, braking system and inner workings of a vehicle. There may also be additional devices such as multiple user devices 130 brought by passengers into a vehicle. The telematics device is configured to receive information from the electronics in the vehicle 140. For example, the telematics device is configured to receive data concerning, speed, braking, location, seat settings, lane changes, radio volume, window controls, vehicle servicing, number of cellular devices in a vehicle, proximity to other vehicle's and their devices, etc. The telematics device may be configured to transmit the telematics data directly to the DCU 110. The DCU 110 may then format the telematics data and transmit it to the DPU 170. The DPU 170 may use a software based algorithm to analyze the telematics data to identify driving segments wherein each driving segment is associated with a driver signature. The DPU 170 may then categorize each signature as a known or unknown driver. Wherein the DPU 170, a signature with drivers listed on the insurance, may associate. The DPU 170 may further be configured to categorize unknown driver signatures as potentially impaired/distracted driving. The DPU 170 may compare the driver signatures with the expected drivers to determine the driver of a vehicle for each determined driving segment.

The system 100 may identify the driver based on the seat, mirror settings of the vehicle. The DPU 170 may identify the driver based on the route or destination in which the vehicle 140 is travelling (for example, based on the employment information, if the vehicle drives and parks for an extended time at an office, it may identify the driver.) Alternatively or additionally, if a user device 130 is connected with the vehicle 140 via BLUETOOTH, it may identify a phone number associated with the user device 130 and identify the driver based on that information. To further enhance this data, if the user device 130 is used for a phone call over the speaker phone, based on the location of the microphone that picks up the speech, the identification of the driver may be determined more accurately using voice recognition techniques.

Some vehicles 140 may automatically adjust the driving position based on an electronic key that is used for entry into the vehicle or to start the vehicle. The telematics device may be configured to identify the key used to activate the vehicle 140. Then, if the seat/vehicle setting remains the same, for example, the telematics device may transmit this information to the DCU 110, which then transmits the telematics data to the DPU 170 which is able to determine that the driver is the same as the registered or expected key owner. If the seat/vehicle settings are adjusted, then a DPU 170 may determine that a different driver is driving the vehicle 140.

In one embodiment, the DPU 170 may use the implicit driver identification, based on telematics data, to identify the number of unique driver signatures operating each vehicle and the amount of time each of the unique driving signatures are operating each vehicle. The DPU 170 may use this information to determine the number and identity of drivers for each vehicle on the policy. The DPU 170 may communicate this information to the RPU 160, which may be configured to adjust the pricing information associated with the account. The pricing information may be adjusted, for example, by modifying the rate or rate category associated with the account or by providing a discount or penalty to the previous rate.

In another embodiment, the DPU 170 may be configured to access social media information associated with the drivers, and this information may be stored, for example on storage 192 associated with external servers 190. For example, the DPU 170 may receive data from an external server 190 associated with GOOGLE or FOURSQUARE or other similar application, which tracks an individual's location. The DPU 170 may be configured to compare the checked in location with the location of the vehicle 140 indicated by the telematics device and thereby identify the driver.

In another example of implicit driver identification, the DPU 170 may be configured to determine the driver based on the location of the vehicle 140. For example, if the vehicle 140 is driving to or parked at one of the insured's offices, the DPU 170 may identify the driver as a particular person.

The telematics device may be configured to transmit explicit driver identification information to the DCU 110. The vehicle 140 may be equipped, for example, with biometric readers that explicitly identify the driver. For example, to activate the vehicle 140, the driver may submit a fingerprint, retina sample, a voice sample or other similar biometric data. The telematics device may be configured to transmit this explicit identification information to the DCU 110.

The DCU 110 is configured to receive telematics data which is then formatted and sent to the DPU 170. The DPU 170 analyzes the information and clusters the time into segments. The segments may include time during which the vehicle 140 is being driven and time the vehicle 140 is parked. The DPU 170 may use telematics data and associate a driver or a driver signature with each driving segment. The RPU 160 may use the driver signature information in a number of ways to adjust the pricing information. The RPU 160 may be configured to assess risk associated with coverage without identifying the driver, and only the driving behavior. In this embodiment, the RPU 160 generates a risk assessment or profile, which may be based on the risk associated with insuring the vehicle based on the vehicle and the driver signatures.

An example of the telematics data, stored and transmitted by a telematics device is shown in Table 1, below. The telematics device may be configured to include an event/status monitor of the vehicle's 140 activities. An example of the event/status log, which may be stored in a database operatively coupled to the telematics device.

TABLE 1

| Telematics Information Recorded | | | | | | | | |
|---|---|---|---|---|---|---|---|---|
| Time | Speed | Accel | Radio Volume | Phone | Location | Brakes | Turning | Turn Signal |
| 1:05 am | 76 | 4 | 8 | | 32605 | | | |
| 1:06 am | 86 | −6 | 8 | Y | 32605 | Y | | |
| 1:07 am | 54 | 30 | 8 | | 32606 | | | |
| 1:08 am | 86 | −2 | 9 | N | 32606 | Y | Y | N |
| 1:09 am | 52 | −30 | 9 | | 32606 | | | |

The telematics device may be configured to take periodic measurements regarding the vehicle, as well as event triggered measurements. For example, the telematics device may be configured to take readings every 1 second. The telematics device may be configured with different intervals for each measurement, for example, while speed may be reported every second, the radio volume may be reported each minute. The DCU 110 may be configured to receive this information and format the information to the specifications required by the DPU 170. Additionally, the telematics device may be configured to take readings based on event triggers, such as a detected turn, brake event, and phone activation, etc. The example above is not exhaustive; the metrics are shown as example only.

In another embodiment, the DPU 170 may be configured to determine when a braking event occurs. In this example, the DPU 170 may be configured to analyze speed and acceleration information to determine whether a braking event occurred. For example, if the acceleration telematics data is below a threshold, a braking event may be declared.

Similarly, if the positioning of the vehicle 140, relative to a determined center line of a road veers, the DPU 170 may determine a turn event, a lane change event, or impaired driving.

This information is received, by the DPU 170, which may then perform analysis to determine driver signatures.

Based on the type of plan, the RPU 160 may access the database 176 associated with the DPU 170 to determine risk and pricing information.

The RPU 160 may determine the pricing based on the percentage of time each vehicle is driven by a particular driver. The DPU 170 may associate each driving segment, based on the driver signature of that segment, with a driver. After associating each driving segment for a vehicle 140 with a driver, the DPU 170 then calculates percentages of vehicle driving time to apportion to each driver.

The system 100 uses the information provided in web page 1102 to generate an initial vehicle usage profile for each of the listed drivers. However, the telematics data, provided by the telematics device may be used to refine, replace, or adjust this information. The DPU 170 may use the information received from the DCU 110, to estimate the total use time for a vehicle 140. The system 100 categorizes each segment as being driven by a known driver (i.e. listed on the insurance) or an unknown driver (i.e. third party or impaired diver). Table 2, below shows an example of a usage chart generated by the system 100.

TABLE 2

|  | Vehicle 1 | Vehicle 2 |
|---|---|---|
| John Doe | 80% | 10% |
| Jim Doe | 19% | 40% |
| Unknown Driver 1 | .5% | 50% |
| Unknown Driver 2 | .5% | 0% |

As shown in Table 2, above, the system 100 may be able to identify individual drivers. The unknown drivers may indicate that the vehicle 140 is being operated by an impaired driver, a distracted driver or unregistered driver. Additionally, it may indicate that the vehicle is being moved via a tow truck. Based on the received information, the DPU 170 may identify unique driver signatures and categorize the use of each vehicle. The DPU 170 may identify these driver signatures by clustering driving characteristics into segments using a multivariate analysis. The DPU 170 is configured to weight the information, based on the source (e.g. implicit driver identification, explicit driver identification). For example, if biometric readings provide explicit driver identification information, the likelihood of accurate driver identification is higher; it may therefore be weighted higher in the algorithm that determines the likely driver at each time. Implicit identification of a driver may be less accurate; accordingly each implicit identification may be weighted lower. For example, if Jim Doe is 6'8 and John Doe is 5'5, and the DPU 170 has access to seat adjustment information, it may compare the seat placement versus the height of the drivers. In this case the driver settings may provide a reliable indicator of the driver. However, braking, driver speed may be less likely an indicator in certain circumstances.

The RPU 160 may determine pricing information for the account, for example, based on an adjusted rate or a credit or penalty based on this information. For example, if the amount of driving segments that are identified as impaired, distracted or unregistered are above a predetermined threshold, the RPU 160 may determine that the pricing information should be adjusted.

The system 100 may further be configured to proactively adjust pricing information based on dropped high risk behavior. For example, if the DPU 170 determines that the amount of impaired, distracted or unregistered driving is below a predetermined threshold, or if the signature associated with a high risk driver improves or is reduced relative to one or more vehicles.

In another embodiment, the RPU 160 may assign risk, agnostic of the driver, based on the driving signatures. In this example, the RPU 160 requests data from the DPU 170 regarding the driving characteristics. Each use of the vehicle is categorized. For example, see Table 3 below:

TABLE 3

|  | Vehicle 1 | Vehicle 2 |
|---|---|---|
| High Risk Use | 25% | 55% |
| Medium Risk Use | 25% | 35% |
| Low Risk Use | 50% | 10% |

Based on the amount of time the vehicle is driven in each risk category, the RPU 160 may determine pricing information without needing to identify the number of drivers or the identity of those drivers.

In one scenario, the system 100 may receive telematics data for a fixed time period. In this scenario, the RPU 160 may be configured to compensate for the limited duration of the telematics data using a seasonality factor. For example, if the telematics data is received from September-December, and the biographical information indicates one of the insured drivers attends college away from home, RPU 160 may be configured to use the seasonality factor to adjust the pricing information to account for the lack of information transmitted regarding that driver. Conversely, under the same scenario, if the readings were taken during the summer, when the student was home, the telematics data may be skewed the other way. Accordingly, the RPU 160 may use the seasonality factor to account for those differences.

The system 100 may further be configured to provide discounts outside typical renewal periods. For example, if an account includes a student driver and that student driver is associated with a high risk driver signature. If that student goes away to college, and the absence of high risk driver signature is measured for a predetermined period of time, then the system 100 may be configured to confirm that a driver has moved out and may offer an immediate discount.

In another embodiment, the system 100 may be configured to transmit the driver signature information to the customer. This may allow a customer to identify high risk driving behaviors and adjust the behaviors to lower their premium. This information may be accessible, for example, through web site system 120, or through an app loaded onto a user device 130.

Figure 14A:
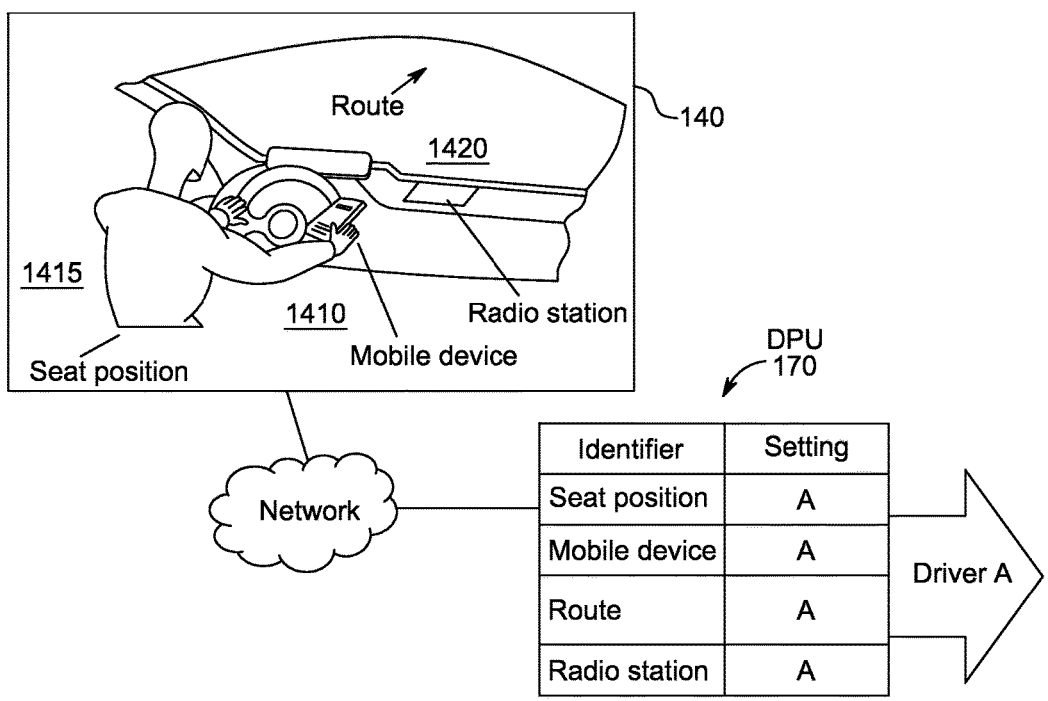
FIG. 14A shows an example configuration for determining a driver signature based on telematics data.

FIG. 14A shows an example configuration for determining a driver signature based on telematics data. As shown in FIG. 14, a driver is situated in the vehicle 140. The vehicle 140 includes an electronic seat adjustment unit 1415 and a radio 1420. The driver of the vehicle 140 also has a mobile device 1410. In this embodiment, the mobile device 1410 includes an app that enables it to operate as the telematics device. The mobile device 1410 may be connected to the vehicle 140 using a BLUETOOTH communications link. The mobile device 1410 receives seat position information, route information, radio station information, and other telematics data from the vehicle 140. The mobile device 1410 may communicate this information to a telematics collection server, such as the DCU 110. This information may be communicated continuously during the vehicle's 140 operation, or in another embodiment the mobile device 1410 may be configured to transmit the information at scheduled times, for example, when the mobile device 1410 is connected to a Wi-Fi network. The telematics collection server receives this information and may format the telematics data and send it to the DPU 170. The DPU 170 compares the received telematics data with preconfigured expected telematics values. As shown in FIG. 14A, the seat position information is compared with the expected seat position and it is determined that this is indicative of Driver A. The mobile device 1410 recording the information is determined to be indicative of Driver A. The route driven by vehicle 140 is indicative of Driver A. The use of radio 1420 is determined to be indicative of driver A. While in this example, each factor is indicative of driver A, in other examples, the seat position may be indicative of a Driver C and radio station may be indicative of a Driver B, by way of example. The DPU 170 may use a multivariate analysis to identify the driver of the vehicle 140 for a particular trip based on this received telematics information. Additionally, if all of the insured drivers are registered with the system 100, and if vehicle usage shows extended driving periods, not accounted for by the data transmitted by the mobile devices (e.g. 1410), the system 100 may determine the use is by an unregistered driver. In the example shown in FIG. 14A, the DPU 170 determines the driver to be driver A.

If the user is a potential customer, the user may provide or upload information from past experiences to the system 100. Or they may enroll to receive a trial telematics device prior to receiving an initial quote.

Figure 14B:
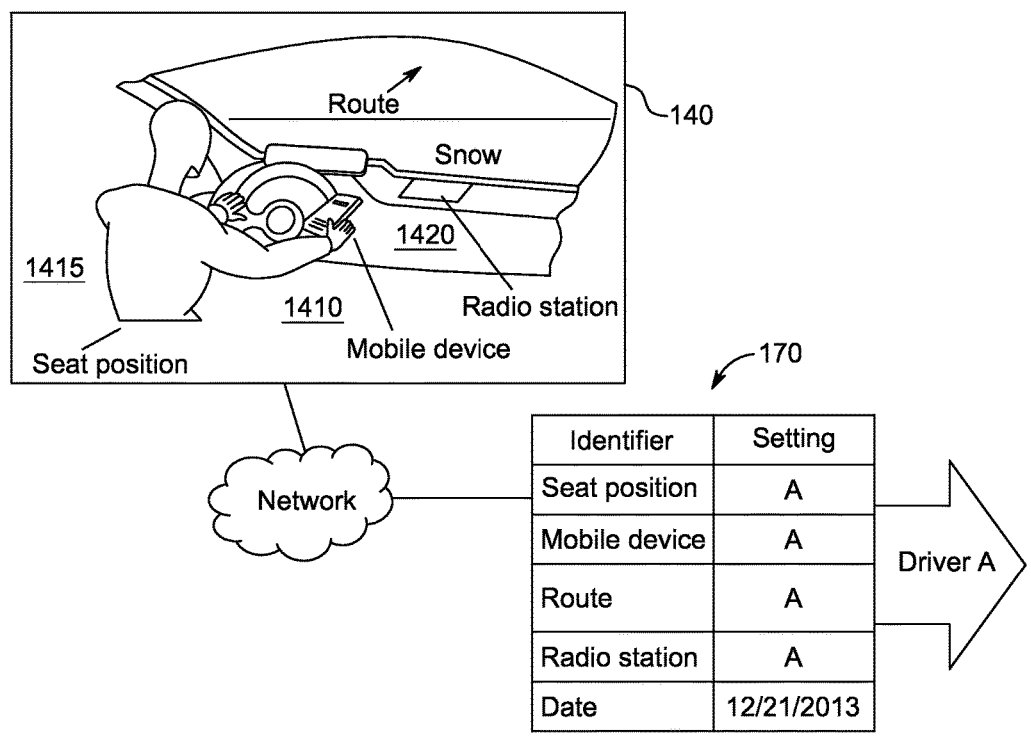
FIG. 14B shows an example configuration for determining a driver signature based on telematics data that accounts for a seasonality factor.

FIG. 14B shows an example configuration for determining a driver signature based on telematics data that accounts for a seasonality factor. As shown in FIG. 14B, the mobile device 1410 may be configured to communicate the telematics data as discussed in reference to FIG. 14A. In this example, telematics collection server may further be configured to communicate the date during which the vehicle was driven. This may be important, for example, if a student driver only drives 5% of the time, but that 5% of the time is during a snowy season. Additionally, as discussed above, the RPU 160 may incorporate a seasonality factor to compensate for expected changes in driving patterns during different times of year (e.g. different schedules during the school year.) The system 100 may be configured to use additional telematics data, for example, received from third party systems that may include weather data, traffic data, and other relevant data in compensating for seasonality.

Illustrative examples of the system 100 implementing driver signatures are shown below.

In a first scenario, the number of vehicles covered by the policy may include the number of listed drivers. Table 4 shows a driver proxy score below:

TABLE 4

Driver Proxy Score

| Assigned by Insurance rating | Assignment | Driver Proxy Score (1-50) |
| --- | --- | --- |
| Vehicle 1 | Driver 1 | 30 |
| Vehicle 2 | Driver 2 | 45 |

In the example shown in Table 4, based on the information received from the customer, the assigned score is based on the expectation that vehicle 1 will be driven 100% by driver 1 and vehicle 2 will be driven 100% by driver 2.

However, the DPU 170 may receive telematics data to determine the actual miles driven by each driver. Table 5 below shows the determined actual miles driven.

TABLE 5

Actual Miles Driven, as determined by telematics data

| | Driver 1 | Driver 2 | |
| --- | --- | --- | --- |
| Vehicle 1 | 80% | 20% | 100% |
| Vehicle 2 | 20 | 80% | 100% |

The DPU 170 may be configured to generate a weighted average of driver score for vehicle 1 using driver signature= (percentage of time driven by driver 1)(driver proxy score)+ (percentage of time driven by driver 2)(driver proxy score).

The DPU may further generate a weighted average of driver score for vehicle 2, for example, using as driver signature=driver signature=(percentage of time driven by driver 1)(driver proxy score)+(percentage of time driven by driver 2)(driver proxy score).

Based on this information, the DPU 170 determines a driver signature relativity for each vehicle=actual/expected.

The RPU 160 may use the driver signature relativity to determine pricing information. In one embodiment, the RPU 160 may generate a blended rate, based on the driver signature relativity. Additionally or alternatively, the RPU 160 may be configured to adjust the rate or provide a credit or penalty to the account.

In another scenario, the number of vehicles may be greater than the number of drivers.

Based on the customer provided biographical information, the DPU 170 may determine a driver proxy score for each vehicle. Table 6 shows an example of driver proxy scores in the scenario where there are more vehicles than drivers.

TABLE 6

Driver Proxy Scores when Vehicles > Drivers

| Assigned by conventional rating | Assignment | Driver Proxy Score (1-50) |
| --- | --- | --- |
| Vehicle 1 | Driver 1 | 30 |
| Vehicle 2 | Driver 2 | 40 |
| Vehicle 3 | Driver 2 | 40 |

Based on the information received during the registration phase (or alternatively on past experience), in the more cars than drivers (MCTD) scenario DPU 170 assigns a score based on an assumption that vehicle 3 will be driven 100% by driver 2, the worse of the two drivers. Table 7 shows the determined actual miles for each vehicle by each driver.

TABLE 7

Actual Miles Driven when Vehicles > Drivers

|  | Driver 1 Miles Driven | Driver 2 Miles Driven |  |
|---|---|---|---|
| Vehicle 1 | 80% | 20% | 100% |
| Vehicle 2 | 30% | 70% | 100% |
| Vehicle 3 | 50% | 50% | 100% |

Based on this information, the DPU 170 may determine the weighted average of driver score for vehicle 1 using driver signature=0.80*30+0.20*40.

The DPU 170 may determine the weighted average of driver score for Vehicle 2 using driver signature=0.30*30+0.70*40.

The DPU 170 may determine the weighted average of driver score for Vehicle 3 using driver signature=0.50*30+0.50*40.

The DPU 170 uses this information to determine a driver signature relativity adjustment for each vehicle=actual/expected.

The RPU 160 may use the driver signature relativity to determine pricing information. In one embodiment, the RPU 160 may generate a blended rate, based on the driver signature relativity. Additionally or alternatively, the RPU 160 may be configured to adjust the rate or provide a credit or penalty to the account.

The system 100 may further be configured to account for technologies such as "driverless car technology," which may allow for autonomous operation of a vehicle, or aspects of a vehicle. The autonomous driver may be controlled by the vehicle's 140 control system. In one embodiment, the system 100 may be configured with a predetermined score for a driverless system. This may include scoring route selection patterns, braking patterns, accelerating patterns, and the speed, proportionality and accuracy of the vehicle's response to the environment, such as obstacles and changing conditions. The automated system would be treated as a unique driver with a particular signature attached. The system 100 may then be configured to account for the time a vehicle 140 is driven by a driverless vehicle system.

Figure 15:
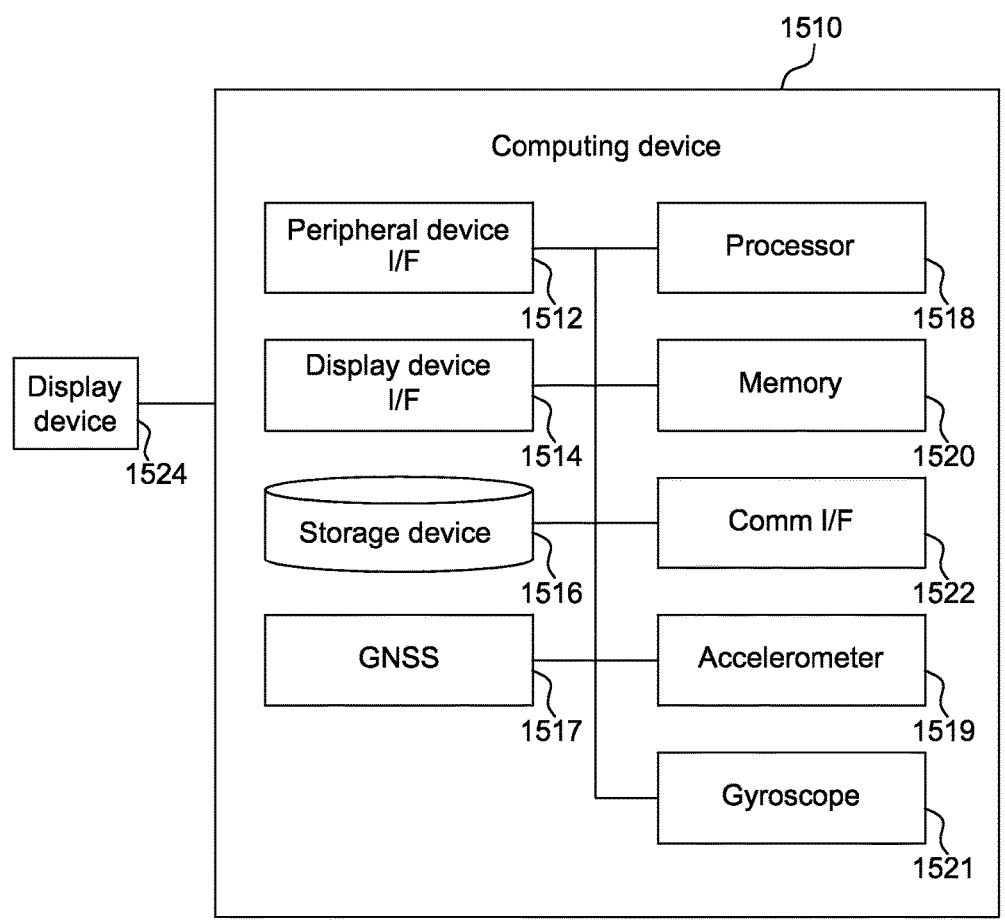
FIG. 15 shows an example electronic device that may be used to implement features described herein with reference to FIGS. 1-14.

FIG. 15 shows an example computing device 1510 that may be used to implement features described above with reference to FIGS. 1-14. The computing device 1510 includes a global navigation satellite system (GNSS) receiver 1517, an accelerometer 1519, a gyroscope 1521, a processor 1518, memory device 1520, communication interface 1522, peripheral device interface 1512, display device interface 1514, and a storage device 1516. FIG. 15 also shows a display device 1524, which may be coupled to or included within the computing device 1510.

The system 100 may further include a user transmission device (not pictured) wherein the user transmission device may communicate insurance information, including pricing information, contractual information, information related to the telematics program, and other notifications. A user transmission device may include one or more modes of communication to reach a potential customer, current customer, or past customer or other similar user. For example, the user transmission device may be coupled with a printing device that is automatically mailed to the user. In another embodiment, the user transmission device may be coupled to a device to generate automatic telephone calls, or "robocalls," or other similar communication mediums to communicate with the user. The user transmission device may further be configured to send e-mails to a user. The user device may further be configured to communicate via social media.

The memory device 1520 may be or include a device such as a Dynamic Random Access Memory (D-RAM), Static RAM (S-RAM), or other RAM or a flash memory. The storage device 1516 may be or include a hard disk, a magneto-optical medium, an optical medium such as a CD-ROM, a digital versatile disk (DVDs), or BLU-RAY disc (BD), or other type of device for electronic data storage.

The communication interface 1522 may be, for example, a communications port, a wired transceiver, a wireless transceiver, and/or a network card. The communication interface 1522 may be capable of communicating using technologies such as Ethernet, fiber optics, microwave, xDSL (Digital Subscriber Line), Wireless Local Area Network (WLAN) technology, wireless cellular technology, BLUETOOTH technology and/or any other appropriate technology.

The peripheral device interface 1512 may be an interface configured to communicate with one or more peripheral devices. As an example, the peripheral device may communicate with an on-board diagnostics (OBD) unit that is associated with a vehicle. The peripheral device interface 1512 may operate using a technology such as Universal Serial Bus (USB), PS/2, BLUETOOTH, infrared, serial port, parallel port, and/or other appropriate technology. The peripheral device interface 1512 may, for example, receive input data from an input device such as a keyboard, a mouse, a trackball, a touch screen, a touch pad, a stylus pad, and/or other device. Alternatively or additionally, the peripheral device interface 1512 may communicate output data to a printer that is attached to the computing device 1510 via the peripheral device interface 1512.

The display device interface 1514 may be an interface configured to communicate data to display device 1524. The display device 1524 may be, for example, an in-dash display, a monitor or television display, a plasma display, a liquid crystal display (LCD), and/or a display based on a technology such as front or rear projection, light emitting diodes (LEDs), organic light-emitting diodes (OLEDs), or Digital Light Processing (DLP). The display device interface 1514 may operate using technology such as Video Graphics Array (VGA), Super VGA (S-VGA), Digital Visual Interface (DVI), High-Definition Multimedia Interface (HDMI), or other appropriate technology. The display device interface 1514 may communicate display data from the processor 1518 to the display device 1524 for display by the display device 1524. As shown in FIG. 15, the display device 1524 may be external to the computing device 1510, and coupled to the computing device 1510 via the display device interface 1514. Alternatively, the display device 1524 may be included in the computing device 1510.

An instance of the computing device 1510 of FIG. 15 may be configured to perform any feature or any combination of features described above as performed by the user device 130. In such an instance, the memory device 1520 and/or the storage device 1516 may store instructions which, when executed by the processor 1518, cause the processor 1518 to perform any feature or any combination of features described above as performed by the web browser module 132. Alternatively or additionally, in such an instance, each or any of the features described above as performed by the web browser module 132 may be performed by the processor 1518 in conjunction with the memory device 1520, communication interface 1522, peripheral device interface 1512, display device interface 1514, and/or storage device 1516.

Although FIG. 15 shows that the computing device 1510 includes a single processor 1518, single memory device 1520, single communication interface 1522, single peripheral device interface 1512, single display device interface 1514, and single storage device 1516, the computing device may include multiples of each or any combination of these components, and may be configured to perform, mutatis mutandis, analogous functionality to that described above.

Figure 16:
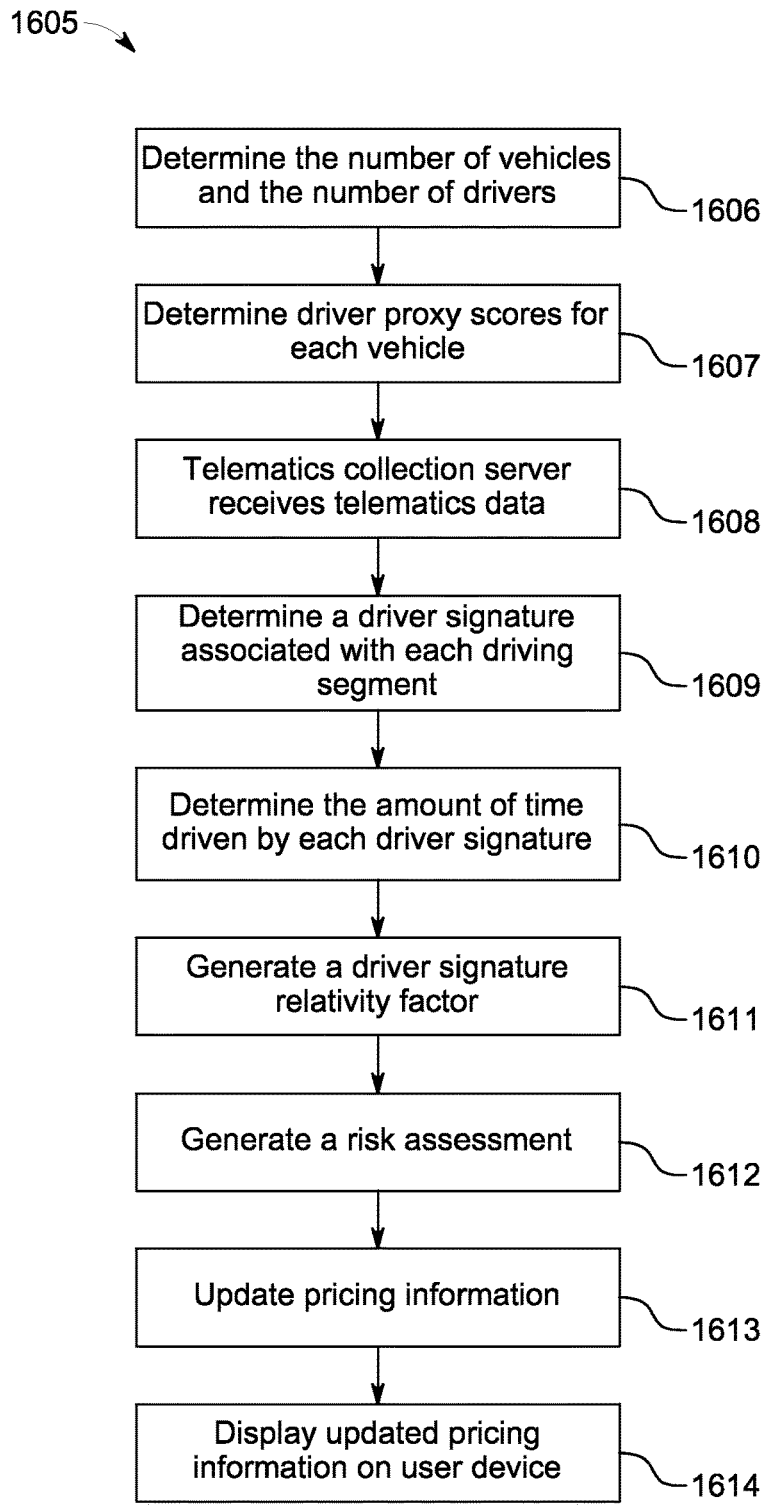
FIG. 16 shows a flow diagram for a method for determining pricing based on driver signatures associated with a vehicle.

FIG. 16 shows a flow diagram for a method 1605 for determining driver signatures associated with vehicle use and updating pricing information based on the determined driver signatures. Because the insurance company may employ a different analysis based on the number of cars relative to the number of drivers, the system 100 may determine the number of vehicles and the number of drivers (step 1606). Based on the number of vehicles and the number of drivers and the expected use of each vehicle, the DPU 170 may determine a driver proxy score for each vehicle (step 1607). A telematics collection server may then receive telematics data associated with each vehicle (step 1608). The telematics collection server may be operated by the insurance company or it may be operated by a third party service. An example of a telematics collection server is the DCU 110. For each segment during which a vehicle is driven, the DPU 170 may analyze the telematics data to determine a driver signature associated with each segment (step 1609). The DPU 170 may determine the amount of time each vehicle was driven by each driver signature (step 1610). Based on this information, the DPU 170 may generate a driver signature relativity factor for each vehicle (step 1611). The driver signature relativity factor may account for the driver proxy score for each vehicle verses the values determined based on driver signatures. The RPU 160 generates a risk assessment based on the driver signature relativity factor (step 1612). In one embodiment, the risk assessment may include vehicle profiles which comprise the total number of drivers and the behavior of each of those drivers. The RPU 160 may then generate updated pricing information based on the risk assessment (step 1613). The website system 120 may communicate the updated pricing information to a user device 130 (step 1614). The website system 120 may further communicate suggested changes in driving behavior that may be used to receive a discount.

The multivariate predictive model(s) that may be used in determining pricing information may include one or more of neural networks, Bayesian networks (such as Hidden Markov models), expert systems, decision trees, collections of decision trees, support vector machines, or other systems known in the art for addressing problems with large numbers of variables. In embodiments, the predictive models are trained on prior data and outcomes using an historical database of insurance related data and resulting correlations relating to a same user, different users, or a combination of a same and different users. The predictive model may be implemented as part of the DPU 170 or RPU 160 described with respect to FIG. 1. The system 100 may be used in combination with an insurance class plan or may be used independent of insurance class plans.

As used herein, the term "processor" broadly refers to and is not limited to a single- or multi-core processor, a special purpose processor, a conventional processor, a Graphics Processing Unit (GPU), a digital signal processor (DSP), a plurality of microprocessors, one or more microprocessors in association with a DSP core, a controller, a microcontroller, one or more Application Specific Integrated Circuits (ASICs), one or more Field Programmable Gate Array (FPGA) circuits, any other type of integrated circuit (IC), a system-on-a-chip (SOC), and/or a state machine.

As used herein, the term "computer-readable medium" broadly refers to and is not limited to a register, a cache memory, a ROM, a semiconductor memory device (such as a D-RAM, S-RAM, or other RAM), a magnetic medium such as a flash memory, a hard disk, a magneto-optical medium, an optical medium such as a CD-ROM, a DVD, or BLURAY-DISC, or other type of device for electronic data storage.

Although the methods and features described above with reference to FIGS. 2-16 are described above as performed using the example system 100 of FIG. 1, the methods and features described above may be performed, mutatis mutandis, using any appropriate architecture and/or computing environment. Although features and elements are described above in particular combinations, each feature or element can be used alone or in any combination with or without the other features and elements. For example, each feature or element as described above with reference to FIGS. 1-16 may be used alone without the other features and elements or in various combinations with or without other features and elements. Sub-elements of the methods and features described above with reference to FIGS. 1-16 may be performed in any arbitrary order (including concurrently), in any combination or sub-combination.

What is claimed is:

1. A system for monitoring vehicle usage parameters and using those parameters to access a driver signature, the system comprising:

a computer memory configured to store biographical information associated with at least one driver;

a processor configured to receive information associated with telematics data, wherein the telematics data is associated with at least one of the vehicle(s), the telematics data providing information concerning use of the at least one vehicle(s);

the processor further configured to access a preconfigured expected information from the stored biographical information associated with at least one driver and any previously received information associated with the telematics data;

the processor further configured to determine discrete segments of use for the at least one vehicle(s) based on at least a portion of the received information associated with the telematics data, and to determine a driver signature associated with each of the discrete segments of use using a multivariate analysis based on at least a portion of the received information associated with the telematics data and comparing the at least a portion of the received information associated with the telematics data with the preconfigured expected information, wherein the preconfigured expected information includes at least one biometric reading or at least one implicit identification factor;

the processor further configured to structure the telematics data of each of the discrete segments based on the driver signature;

the processor further configured to generate a driver risk assessment for the driver based on the determined driver signature and adjust the driver signature relativity automatically based on the signature; and the processor communicating with a user device the driver signature and providing feedback to the user associated with driver signature to improve driving, wherein the driver is determined after the driver signature relativity is adjusted using the driver signature for subsequent discrete segments of use.

2. The system of claim 1, wherein the driver risk assessment accounts for a seasonality factor.

3. The system of claim 1, wherein the processor is further configured to determine a driver associated with each discrete segment of use based at least in part on the driver signature.

4. The system of claim 3, wherein the processor is further configured to determine a driver associated with the discrete segments, based on implicit driver identification factors.

5. The system of claim 1, wherein the driver signature comprises braking patterns.

6. The system of claim 1, wherein the driver signature comprises route selection patterns.

7. The system of claim 1, wherein the risk assessment comprises a risk profile for the at least one vehicle.

8. A computer implemented method for monitoring vehicle usage parameters and using those parameters to determine a driver signature, the method comprising:
   storing, by a computer memory, biographical information associated with at least one driver;
   receiving, by a processor, information associated with telematics data, wherein the telematics data is associated with at least one of the vehicle(s), the telematics data providing information concerning use of the at least one vehicle(s);
   accessing from a database a preconfigured expected information from the stored biographical information associated with at least one driver and any previously received information associated with the telematics data;
   determining, by the processor, discrete segments of use for at least one of the vehicle(s) based on at least a portion of the received information associated with the telematics data, and to determine a driver signature associated with each of the discrete segments of use using a multivariate analysis based on at least a portion of the received information associated with the telematics data and comparing the at least a portion of the received information associated with the telematics data with the preconfigured expected information, wherein the preconfigured expected information includes at least one biometric reading or at least one implicit identification factor;
   generating, by the processor, a driver risk assessment for the driver of the determined driver signature and automatically adjust the driver signature relativity based on the signature; and
   communicating with a user device the driver signature and providing feedback to the user associated with driver signature to improve driving,
   wherein the driver is determined after the driver signature relativity is adjusted using the driver signature for subsequent discrete segments of use.

9. The method of claim 8, wherein the risk assessment accounts for a seasonality factor.

10. The method of claim 8, further comprising:
   determining, by the processor, a driver associated with each discrete segment of use based at least in part on the driver signature.

11. The method of claim 10, further comprising determining, by the processor, a driver associated with the discrete segments, based on implicit driver identification factors.

12. The method of claim 10, further comprising determining, by the processor, a percentage of time each of the at least one vehicle(s) are used by the determined driver.

13. The method of claim 8, wherein the patterns of driver signature comprises braking patterns.

14. The method of claim 8, wherein the patterns of driver signature comprises route selection patterns.

15. A system for monitoring vehicle usage parameters and using those parameters to determine a driver signature for an account that covers at least one vehicle and at least one autonomous driver, the system comprising:
   a computer memory configured to store biographical information associated with at least one driver;
   a processor configured to receive information associated with telematics data, wherein the telematics data is associated with at least one of the vehicle(s), the telematics data providing information concerning use of the at least one vehicle(s);
   the processor further configured to access a preconfigured expected information from the stored biographical information associated with at least one driver and any previously received information associated with the telematics data;
   the processor further configured to determine discrete segments of use for the at least one vehicle(s) based on at least a portion of the received information associated with the telematics data, and to determine a driver signature associated with each of the discrete segments of use using a multivariate analysis based on at least a portion of the received information associated with the telematics data and comparing the at least a portion of the received information associated with the telematics data with the preconfigured expected information, wherein the preconfigured expected information includes at least one biometric reading or at least one implicit identification factor;
   the processor configured to determine which of the discrete segments are driven by the autonomous driver and which segments are driven by a human driver;
   the processor further configured to generate a driver risk assessment for the driver of the determined driver signature and adjust the driver signature relativity automatically based on the signature; and
   the processor communicating with a user device the driver signature and providing feedback to the user associated with driver signature to improve driving,
   wherein the driver is determined after the driver signature relativity is adjusted using the driver signature for subsequent discrete segments of use.

16. The system of claim 15, wherein the user transmission device is configured to output an electronic communication.

17. The system of claim 15, wherein the autonomous driver comprises a control system associated with the vehicle.

* * * * *